US010623247B2

(12) United States Patent
Nakamori

(10) Patent No.: US 10,623,247 B2
(45) Date of Patent: Apr. 14, 2020

(54) INFORMATION PROCESSING APPARATUS PERFORMING SYNCHRONIZATION OF DATA AND DATA SYNCHRONIZATION METHODS

(71) Applicant: CANON KABUSHIKI KAISHA, Tokyo (JP)

(72) Inventor: Yuki Nakamori, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 15/062,660

(22) Filed: Mar. 7, 2016

(65) Prior Publication Data

US 2016/0277241 A1 Sep. 22, 2016

(30) Foreign Application Priority Data

Mar. 16, 2015 (JP) .................................. 2015-052061
Dec. 22, 2015 (JP) .................................. 2015-250357

(51) Int. Cl.
*H04L 12/24* (2006.01)
*G06F 16/27* (2019.01)

(52) U.S. Cl.
CPC .......... *H04L 41/0813* (2013.01); *G06F 16/27* (2019.01); *H04L 41/12* (2013.01)

(58) Field of Classification Search
CPC ................. H04L 41/0813; H04L 41/12; G06F 17/30575; G06F 16/27
See application file for complete search history.

(56) References Cited

U.S. PATENT DOCUMENTS 5,826,253 A * 10/1998 Bredenberg ........ G06F 12/0815
6,374,262 B1    4/2002 Kodama
7,024,430 B1 *  4/2006 Ingraham .......... G06F 17/30575
7,113,963 B1 *  9/2006 McCaw ............ G06F 17/30575
(Continued)

FOREIGN PATENT DOCUMENTS

CN      102104594      6/2011
CN      102483715      5/2012
(Continued)

OTHER PUBLICATIONS

XP055271129, "SyncML—Wikipedia, the free encyclopedia", Mar. 2015 (9 pages).

(Continued)

*Primary Examiner* — John M MacIlwinen
(74) *Attorney, Agent, or Firm* — Venable LLP

(57) ABSTRACT

A server manages first time at which a configuration of a client apparatus is changed, while associating the first time with the client apparatus. The server obtains information indicating second time at which previous synchronization processing of a setting value is performed with the client apparatus. In the case where the second time is after the first time, the server sends, in response to a reception of a request for a setting value from the client, the client apparatus a setting value which is updated after the second time and type of which corresponds to the changed configuration of the client apparatus. In the case where the second time is before the first time, the server sends, in response to a reception of a request for a setting value from the client, the client apparatus setting information including a setting value which is not updated after the second time.

7 Claims, 20 Drawing Sheets

(56) References Cited

U.S. PATENT DOCUMENTS

| | | | |
|---|---|---|---|
| 7,143,153 B1* | 11/2006 | Black | H04L 41/0681 709/223 |
| 9,043,278 B1* | 5/2015 | Wilson | G06F 17/303 707/626 |
| 2003/0097381 A1* | 5/2003 | Detweiler | G06F 17/30008 |
| 2003/0154187 A1* | 8/2003 | Hayakawa | G06F 17/30578 |
| 2005/0044446 A1 | 2/2005 | Sakurai | 714/13 |
| 2006/0277223 A1* | 12/2006 | Gupta | G06F 16/182 |
| 2007/0162892 A1* | 7/2007 | Zenz | G06F 9/44505 717/121 |
| 2007/0283011 A1* | 12/2007 | Rakowski | H04L 41/0803 709/225 |
| 2008/0120270 A1* | 5/2008 | Lamberts | G06F 17/30551 |
| 2009/0037452 A1* | 2/2009 | Baitalmal | G06F 17/30575 |
| 2009/0228606 A1 | 9/2009 | McCarthy et al. | 709/248 |
| 2011/0138079 A1 | 6/2011 | Esaka et al. | 709/248 |
| 2012/0179653 A1* | 7/2012 | Araki | G06F 17/30575 707/634 |
| 2012/0179828 A1* | 7/2012 | Kobayashi | G06F 21/44 709/227 |
| 2012/0310881 A1* | 12/2012 | Shadmon | G06F 17/30362 707/613 |
| 2013/0024422 A1* | 1/2013 | Konagolli Suresh | G06F 17/30578 707/634 |
| 2013/0232156 A1* | 9/2013 | Dunn | G06F 17/30283 707/752 |
| 2014/0289360 A1* | 9/2014 | Mahkovec | G06F 17/30899 709/217 |
| 2014/0324778 A1* | 10/2014 | Bonnell | G06F 17/30575 707/634 |
| 2015/0058287 A1 | 2/2015 | Zhang | 707/610 |
| 2015/0120662 A1* | 4/2015 | Dai | G06F 17/30575 707/634 |
| 2015/0215398 A1* | 7/2015 | Chang | H04L 67/1095 726/8 |
| 2016/0314161 A1* | 10/2016 | Wen | G06F 11/1469 |
| 2018/0203888 A1 | 7/2018 | Wen et al. | G06F 11/1469 |

FOREIGN PATENT DOCUMENTS

| | | |
|---|---|---|
| CN | 103259864 | 8/2013 |
| CN | 103327037 | 9/2013 |
| CN | 103442042 | 12/2013 |
| CN | 103744936 | 4/2014 |
| JP | 11-242533 A | 10/1999 |
| JP | 11-272533 A | 10/1999 |
| JP | 2002-132531 A | 5/2002 |

OTHER PUBLICATIONS

XP055271861, "Using Branches in Subversion—Beanstalk Guides", Feb. 2015 (4 pages).

XP055271965, "Digitale Rechteverwaltung—Wikipedia", Feb. 2015 (24 pages).

XP055272024, "SymTasks Outlook Sync, Outlook Tasks Android Sync", Jan. 2015 (2 pages).

Extended European Search Report dated May 31, 2016, in counterpart EP application No. 16000410.7 (19 pages).

CN Office Action dated Mar. 1, 2019 in counterpart Chinese Patent Application No. 201610151465.6 with English translation.

* cited by examiner

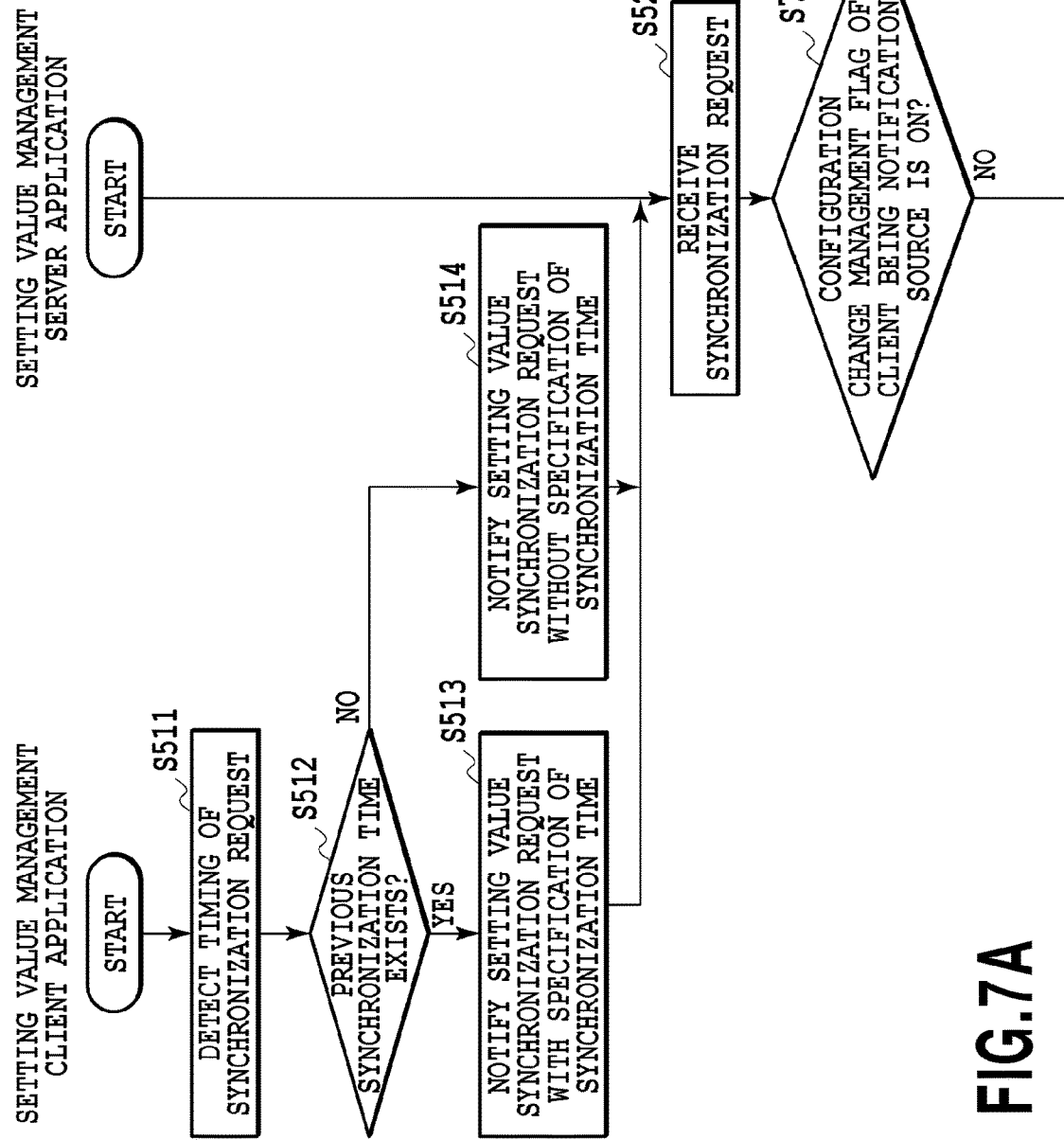

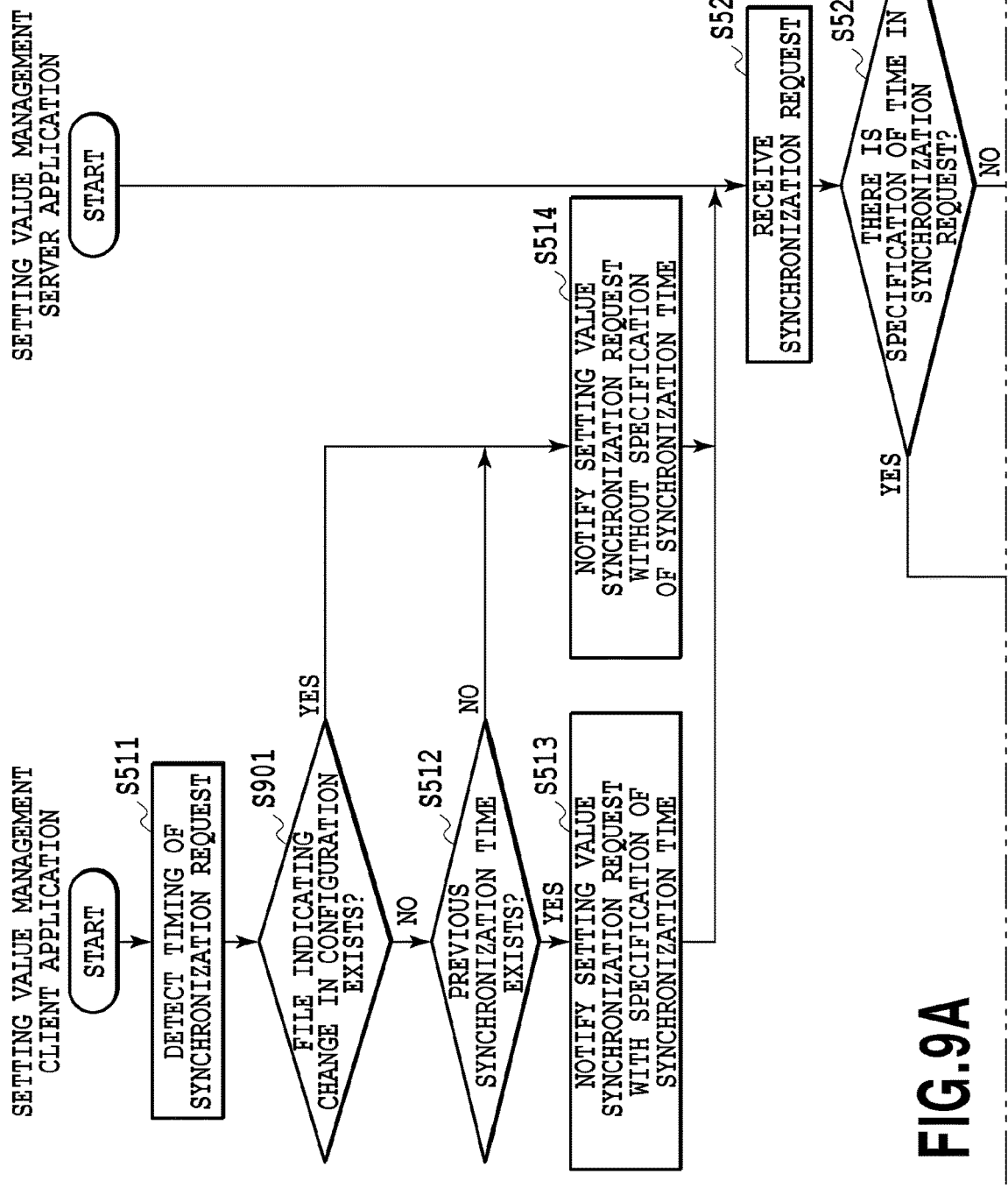

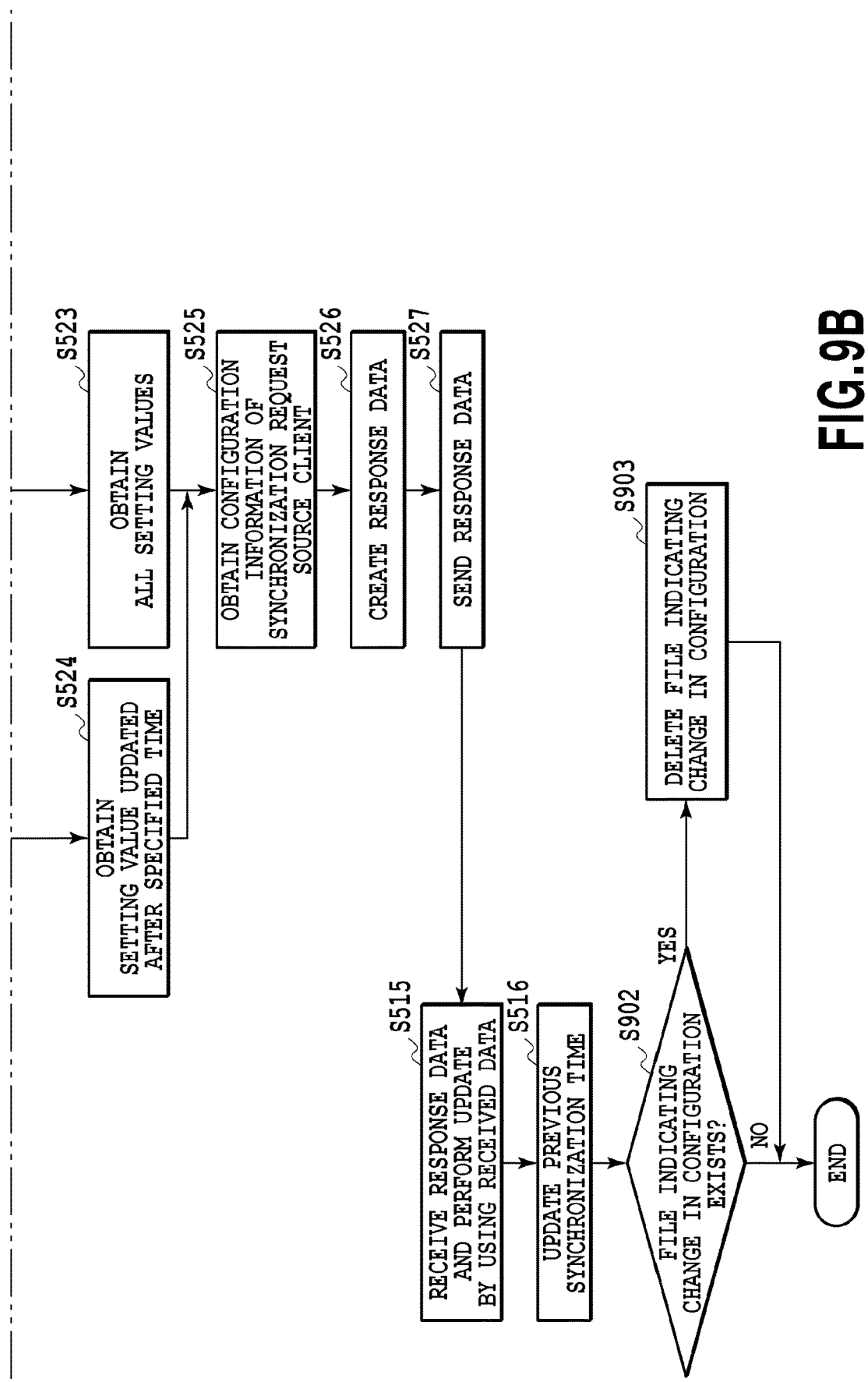

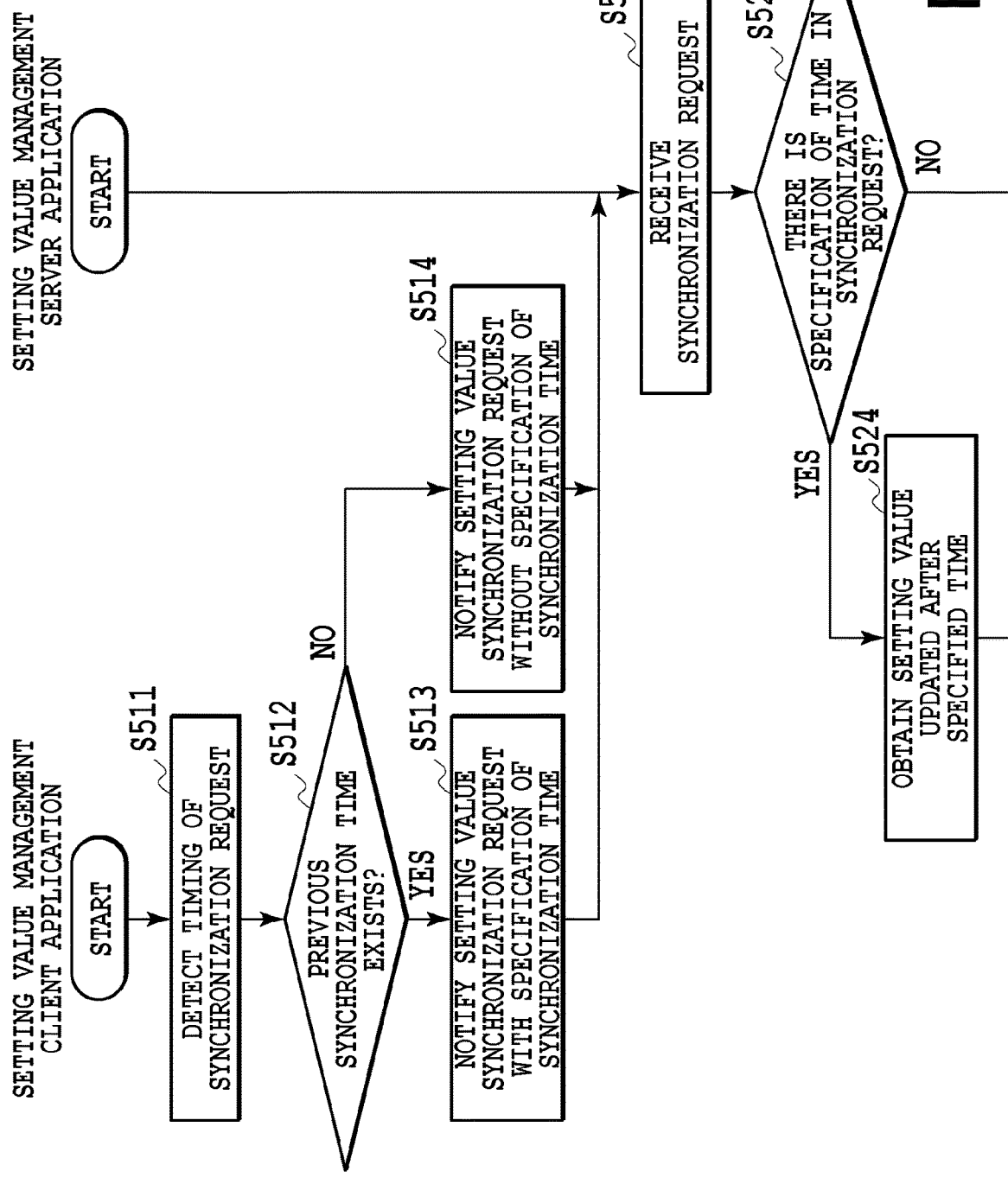

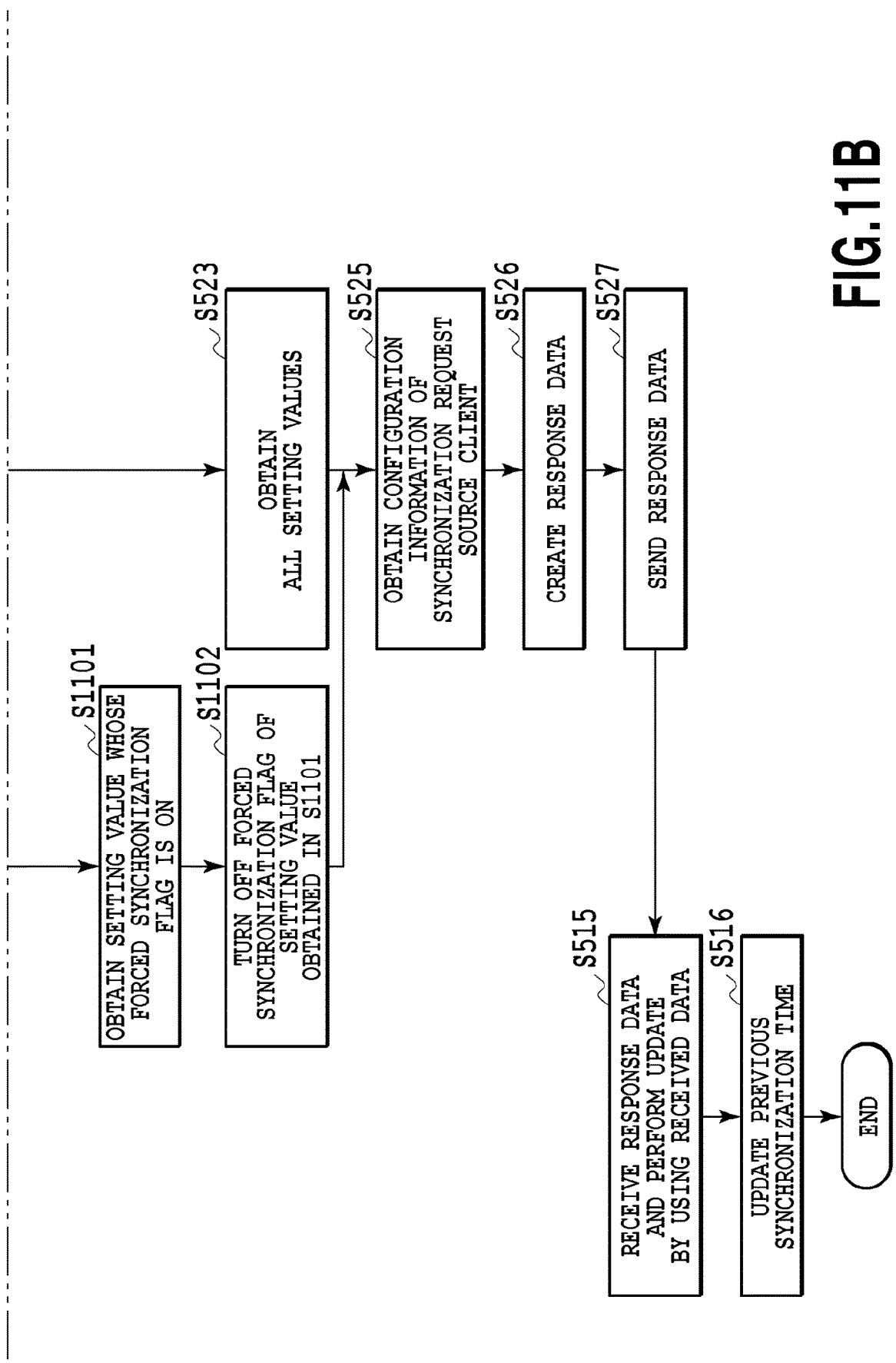

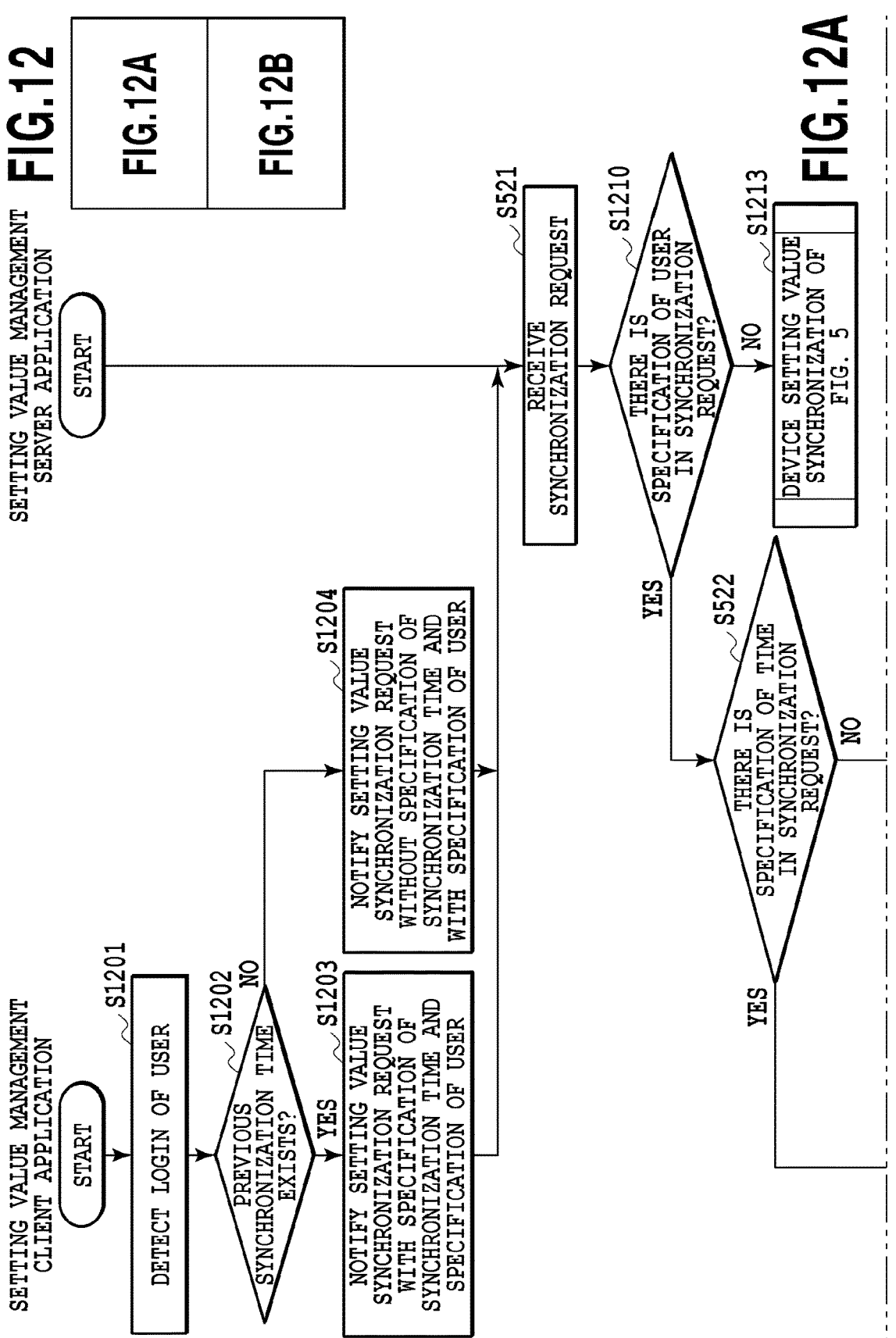

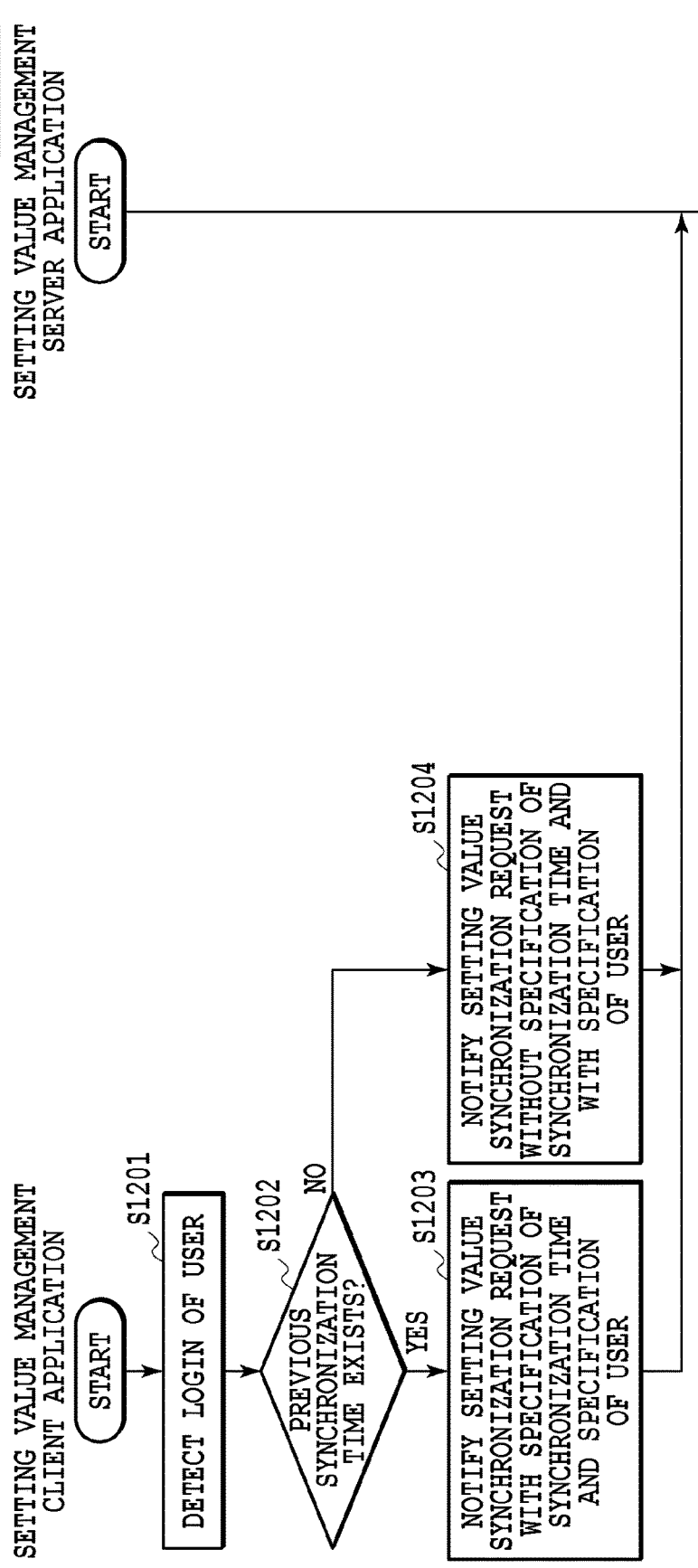

INFORMATION PROCESSING APPARATUS PERFORMING SYNCHRONIZATION OF DATA AND DATA SYNCHRONIZATION METHODS

BACKGROUND OF THE INVENTION

Field of the Invention

The present invention relates to a technique of synchronizing data between information processing apparatuses.

Description of the Related Art

In recent years, there is a technique of synchronizing databases via a network. In the synchronization, instead of synchronizing the entire data in the databases, synchronization based on differences (differential synchronization) is performed. There is a technique of performing differential synchronization processing not at a predetermined timing but at any selected timing (see Japanese Patent Laid-Open No. 2002-132531).

Moreover, there is a method of performing differential synchronization of databases by extracting data changed after the final synchronization time as differences and synchronizing the extracted data (see Japanese Patent Laid-Open No. H11-272533 (1999)).

Consistency of data sometimes cannot be maintained in the case where synchronization processing of a combination of the technique described in Japanese Patent Laid-Open No. 2002-132531 and the technique described in Japanese Patent Laid-Open No. H11-272533 (1999) is performed. Specifically, in the case where the databases are synchronized by extracting the data changed after the final synchronization time as differences, the consistency of data sometimes cannot be maintained if a synchronization request for a database is made at any selected timing.

For example, in a data synchronization system for multiple information processing apparatuses respectively holding databases having the same configuration, each information processing apparatus stores data depending on its functions, configuration, and the like in some cases. Data related to a certain function or configuration is excluded from synchronization target data for an information processing apparatus in which the function or configuration is not enabled. This is because failure may occur if the data effective only if the function or configuration is enabled is synchronized in the information processing apparatus in which the function or configuration is not enabled. Thereafter, in the case where the function or configuration is enabled in the information processing apparatus, the data excluded from the synchronization target by then is added to the synchronization target at certain timing. In such a case, the consistency of data may not be maintained.

Description is given of a specific example. Here, consider a case on the following assumptions: there is an application A which can be installed in information processing apparatuses; multiple information processing apparatuses are under synchronization operation in which data related to the application A is synchronized as a synchronization target among them; an initial value C is stored as the data related to the application A in a database of an information processing apparatus B in which the application A is not installed yet; at a time T, the data related to the application A is changed to a value E in an information processing apparatus D in which the application A is installed and the information processing apparatuses perform the synchronization operation; thereafter, the information processing apparatus again perform the synchronization operation after the time T; and after this operation, the application A is installed in the information processing apparatus B. In this case, since the final synchronization completion time of the information processing apparatus B in this case is after the time T, the synchronization of the data related to the application A is regarded as being completed in the synchronization operation. Accordingly, the data related to the application A is not extracted as a difference from the main database, and the information processing apparatus B operates the application A at the initial value C which should be actually changed to the value E. Or instead, the information processing apparatus B may request the main database to update the data to the value (initial value C) which is the value at the time point when the application A is installed, and a synchronization state desired by a user may not be achieved.

SUMMARY OF THE INVENTION

An information processing apparatus of the present invention is an information processing apparatus comprising: a managing unit configured to manage first time at which a configuration of a client apparatus connected to the information processing apparatus is changed, while associating the first time with the client apparatus; an obtaining unit configured to obtain information indicating second time at which previous synchronization processing of a setting value is performed with the client apparatus; and a sending unit configured to, in a case where the second time obtained by the obtaining unit is after the first time, send, in response to a reception of a request for a setting value from the client, the client apparatus a setting value which is updated after the second time and type of which corresponds to the changed configuration of the client apparatus, and in a case where the second time obtained by the obtaining unit is before the first time, send, in response to a reception of a request for a setting value from the client, the client apparatus setting information including a setting value which is not updated after the second time and type of which corresponds to the changed configuration of the client apparatus.

Further features of the present invention will become apparent from the following description of exemplary embodiments (with reference to the attached drawings).

BRIEF DESCRIPTION OF THE DRAWINGS

FIG. 7 is a diagram showing the relationship of FIGS. 7A and 7B;

FIGS. 7A and 7B are totally a diagram illustrating a flowchart of setting value synchronization request in Example 1;

FIG. 9 is a diagram showing the relationship of FIGS. 9A and 9B;

FIGS. 9A and 9B are totally a diagram illustrating a flowchart of setting value synchronization request in Example 2;

FIG. 11 is a diagram showing the relationship of FIGS. 11A and 11B;

FIGS. 11A and 11B are totally a diagram illustrating a flowchart of setting value synchronization request in Example 3;

FIG. 12 is a diagram showing the relationship of FIGS. 12A and 12B;

FIGS. 12A and 12B are totally a diagram illustrating a flowchart of a data synchronization method in a case where differential synchronization of a setting value with user management is performed;

FIG. 14 is a diagram showing the relationship of FIGS. 14A, 14B, and 14C; and

FIGS. 14A to 14C are totally a diagram illustrating a flowchart of setting value synchronization request in Example 4.

DESCRIPTION OF THE EMBODIMENTS

An embodiment of the present invention is described below by using the drawings. First, a configuration of the embodiment is described with reference to the drawings. Thereafter, general differential synchronization processing performed by using the configuration of the embodiment is described, and complementary description is given of occurrence of problems like the problems described above. Thereafter, examples using the configuration of the embodiment are described.

Figure 1:
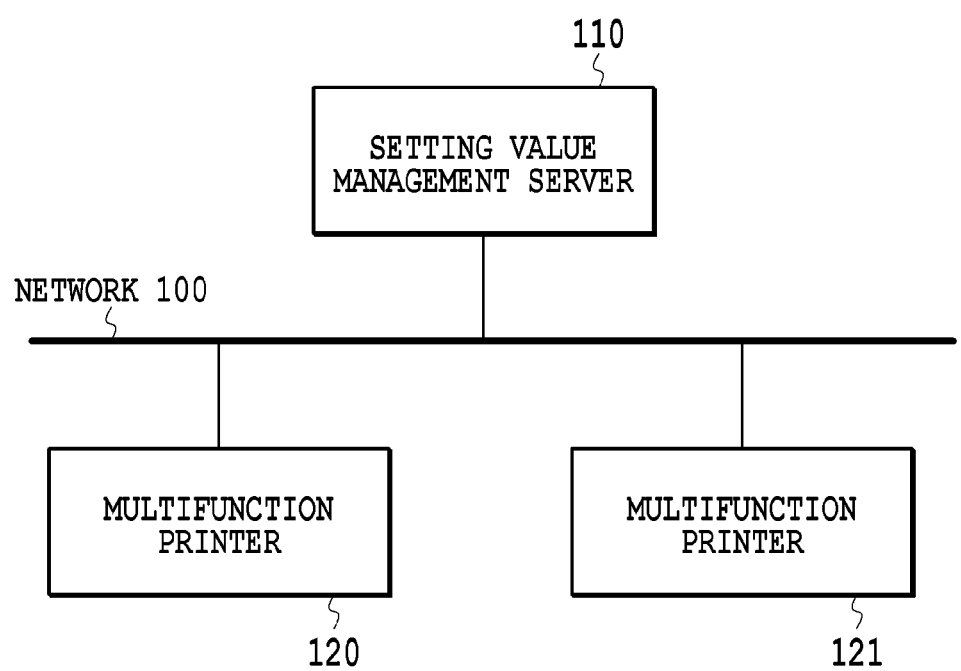
FIG. 1 is a diagram illustrating a configuration of an entire system in examples.

FIG. 1 is a diagram illustrating a system configuration example in which an entire synchronization system of the embodiment is illustrated. A setting value management server 110, a multifunction printer 120, and a multifunction printer 121 are connected to a network 100. Here, although description is given of an example in which two multifunction printers are connected, the system configuration is not limited to this. More multifunction printers may be connected. Moreover, in the configuration described below, although explanation is given by using particularly the multifunction printer 120 as an example, the multifunction printer 121 also has the same configuration as the multifunction printer 120. Note that, although the embodiment is described with the multifunction printers given as examples of information processing apparatuses, the apparatuses may instead be other general information processing apparatuses such computers and mobile terminals. Each of the multifunction printers synchronizes data stored therein with data of the setting value management server. As a result, the data uniquely used in the multifunction printer is synchronized between the multifunction printer and the setting value management server. Moreover, data commonly used between the multifunction printers is sequentially synchronized between the multifunction printers via the setting value management server. Details of synchronization processing are described later.

Figure 2A:
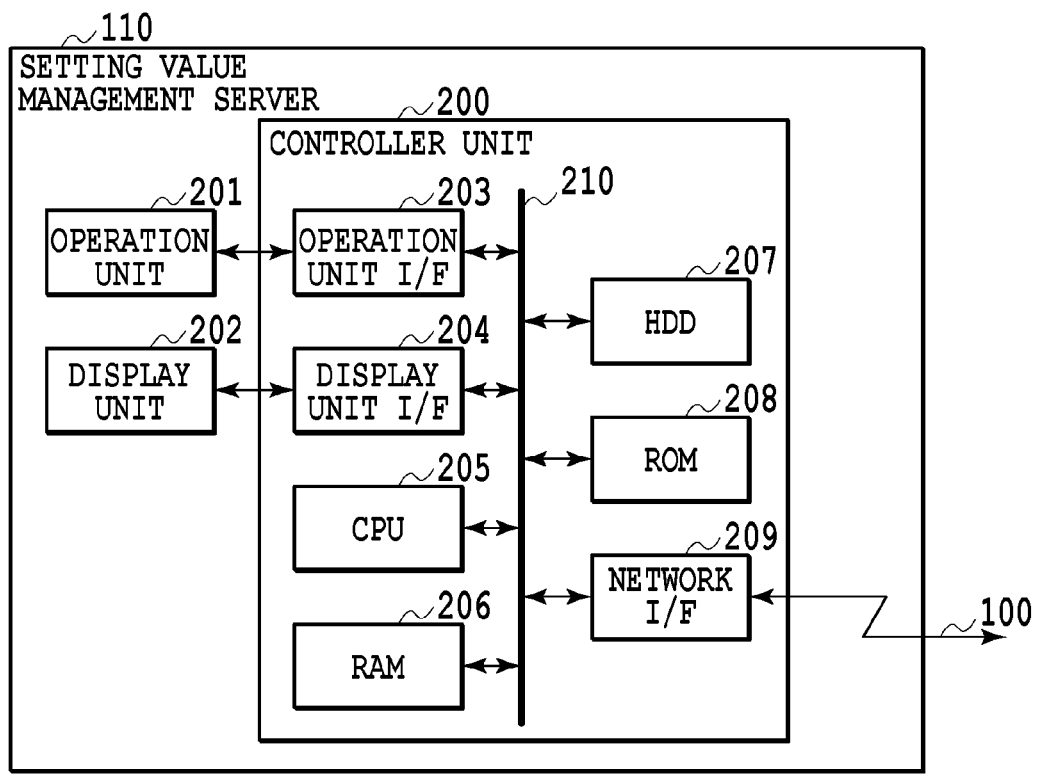
FIGS. 2A and 2B are diagrams illustrating hardware configurations in the examples.
Figure 2B:
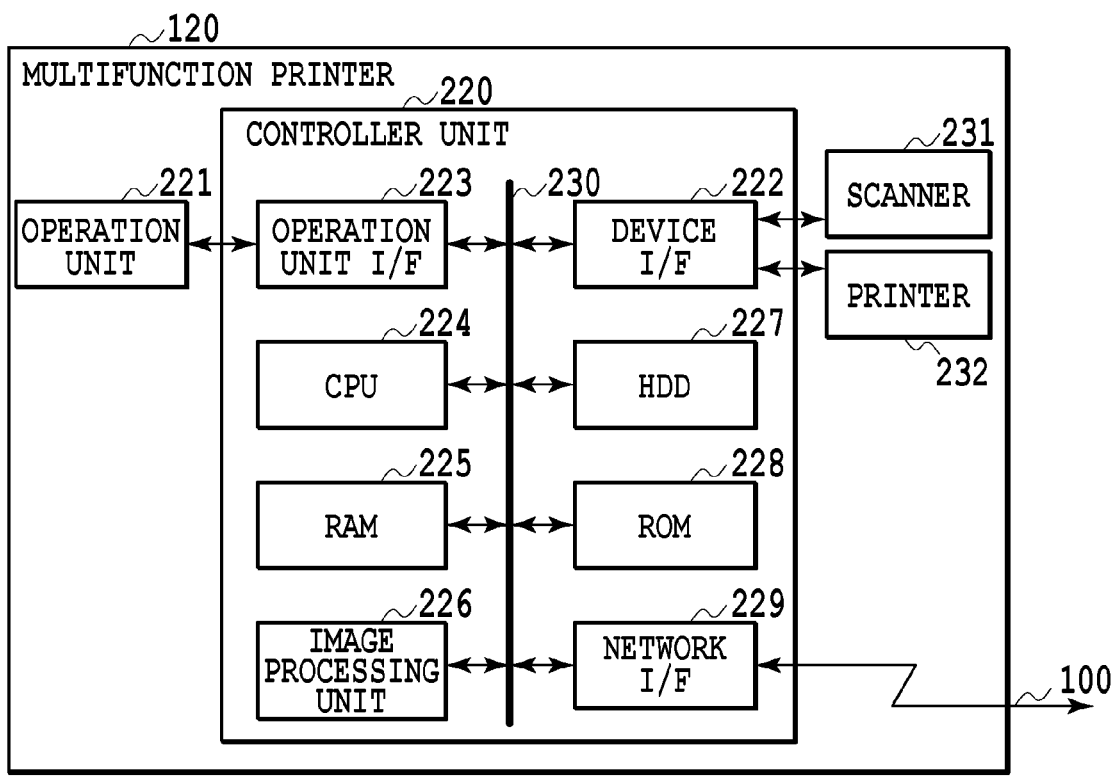

FIG. 2A is a block diagram depicting a configuration of the setting value management server 110 in the embodiment, and FIG. 2B is a block diagram depicting a configuration of the multifunction printer 120.

FIG. 2A is the diagram depicting the configuration of the setting value management server 110. The setting value management server 110 includes a controller unit 200, an operation unit 201, and a display unit 202. The controller unit 200 has an operation unit I/F 203, a display unit I/F 204, a central processing unit (CPU) 205, a random access memory (RAM) 206, a hard disk drive (HDD) 207, a read only memory (ROM) 208, a network I/F 209, and a system bus 210.

The CPU 205 activates an operating system (OS) by using a boot program stored in the ROM 208. The CPU 205 executes an application program stored in the HDD 207 on the activated OS, and executes various types of processing by using this application program. The RAM 206 is used as a work area of the CPU 205. The HDD 207 stores the application program and setting value data of the multifunction printer 120. Details of a method of managing the setting value data are described later.

In addition to the ROM 208 and the RAM 206, the operation unit I/F 203, the display unit I/F 204, and the network I/F 209 are connected to the CPU 205 via the system bus 210. The operation unit I/F 203 is an interface with the operation unit 201 which includes a mouse, a keyboard, and the like, and notifies information inputted by a user using the operation unit 201 to the CPU 205. The display unit I/F 204 outputs image data to be displayed on the display unit 202 which includes a display and the like to the display unit 202. Moreover, the network I/F 209 is connected to the network 100, and performs exchange of information with the apparatuses on the network 100 via the network 100.

FIG. 2B is the diagram depicting the configuration of the multifunction printer 120. The multifunction printer 120 includes a controller unit 220, an operation unit 221, a scanner 231, and a printer 232. The operation unit 221, the scanner 231 which is an image input device, and the printer 232 which is an image output device are connected to the controller unit 220. The image input and output devices connected to the controller unit 220 are not limited to the scanner 231 and the printer 232, and units such as a FAX unit (not illustrated) enabling FAX transmission of transmitting an image generated by the multifunction printer 120 to the outside by using a telephone line can be also connected.

The controller unit 220 has a device I/F 222, an operation unit I/F 223, a CPU 224, a RAM 225, an image processing unit 226, an HDD 227, a ROM 228, and a network I/F 229. The CPU 224 activates an OS by using a boot program stored in the ROM 208. The CPU 224 executes an application program stored in the HDD 227 on the OS to execute various types of processing. The RAM 225 is used as a work area of the CPU 224. Moreover, the RAM 225 provides, in addition to the work area, an image memory area for temporarily storing image data. The HDD 227 stores the application program, the image data, and various setting values. A method of managing the setting values in the multifunction printer 120 is described later.

In addition to the ROM 228 and the RAM 225, the operation unit I/F 223, the device I/F 222, the network I/F 229, and the image processing unit 226 are connected to the CPU 224 via a system bus 230. The operation unit I/F 223 is an interface with the operation unit 221 having a touch panel, and outputs image data to be displayed on the operation unit 221 to the operation unit 221. Moreover, the operation unit I/F 223 sends the CPU 224 information inputted by the user using the operation unit 221. The scanner 231 and the printer 232 are connected to the device I/F 222, and the device I/F 222 performs conversion between synchronous image data and non-synchronous image data. The network I/F 229 is connected to the network 100 and exchanges information with the apparatuses on the network 100 via the network 100.

The image processing unit 226 performs processing such as processing for an image inputted from the scanner 231, processing for an image to be outputted to the printer 232, image turning, image compression, resolution conversion, color space conversion, and tone conversion.

Figure 3A:
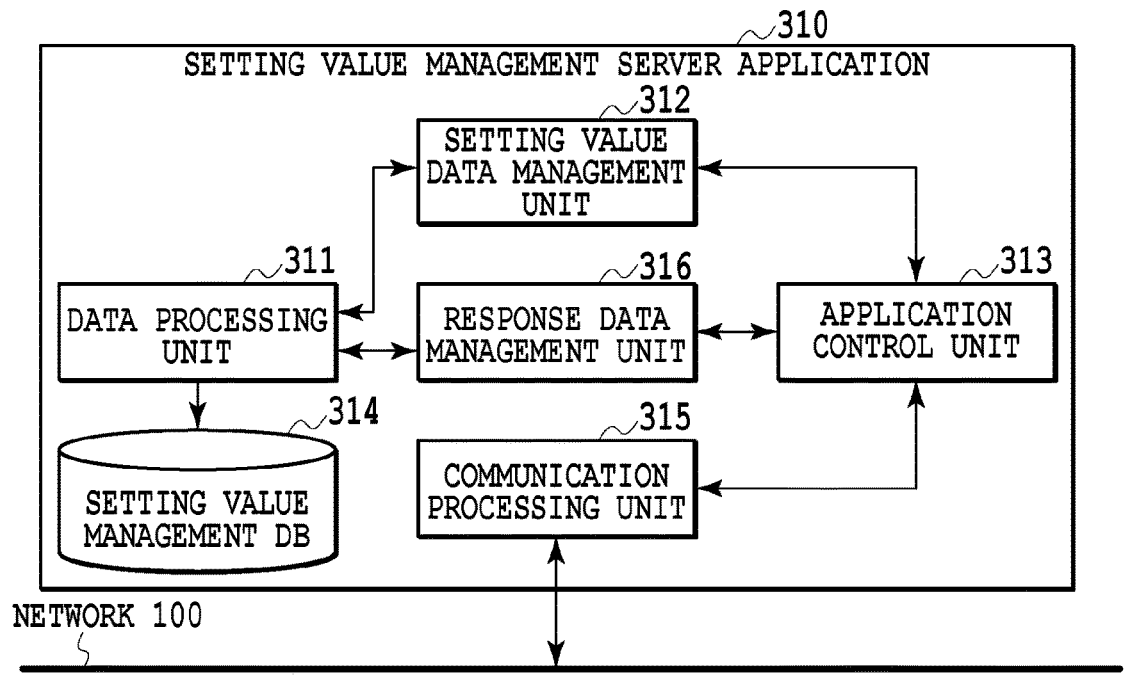
FIGS. 3A and 3B are diagrams illustrating software configurations in the examples.
Figure 3B:
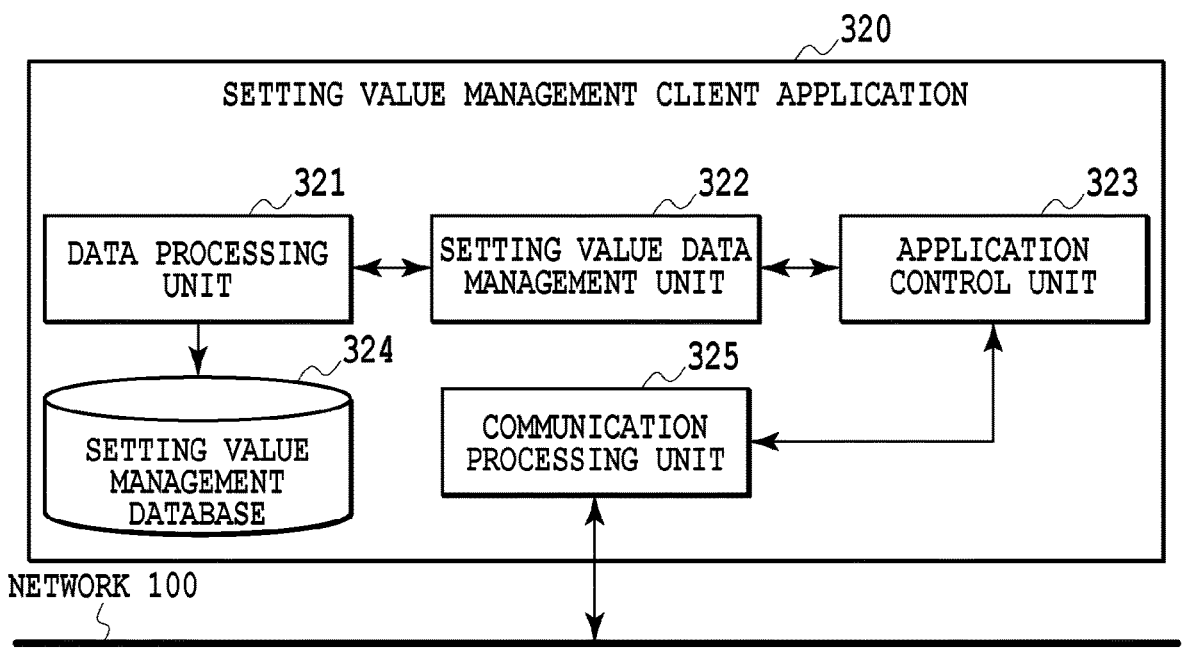

FIGS. 3A and 3B are software configuration diagrams of setting value synchronization systems operating respectively inside the setting value management server 110 of FIG. 2A and the multifunction printer 120 of FIG. 2B which are described above.

First, a setting value management client application operating in the multifunction printer 120 is described. Note that, in the followings description, applications may be simply referred to as apps. Moreover, the multifunction printer 120 functions as a client. FIG. 3B is the diagram depicting a configuration of the setting value management client app operating in the multifunction printer 120. The setting value management client app 320 of FIG. 3B is stored in the ROM 228, the HDD 227, and the like on the multifunction printer 120, and is executed by the CPU 224.

The setting value management client app 320 has a data processing unit 321, a setting value data management unit 322, an application control unit 323, a setting value management database 324, and a communication processing unit 325.

Setting values as depicted in Table 1 and Table 2 can be given as examples of the setting value data stored in the setting value management database 324.

TABLE 1

Device Setting Values Stored in DB of Multifunction Printer

| Key Identifier | UI Display Name | Setting Value | Initial Value |
|---|---|---|---|
| settings.device.sirial | Serial ID | 1234567 | "" |
| settings.device.name | Device Name | iR-ADV C5255 | "" |
| settings.device.frmversion | Firmware Version | Ver 00.01 | Ver 00.00 |
| settings.devic.network.ipaddress | IP Address | 192.168.111.222 | 255.255.255.255 |
| settings.device.phonenumber | Phone Number | 03-0000-1111 | 00-0000-0000 |
| settings.fax.phonenumber | FAX Phone Number | 00-0000-0000 | 00-0000-0000 |
| settings.license.ipfax | IP FAX License | OFF | OFF |
| settings.option.finisherX | Cassette Feeder 500 | ON | OFF |
| settings.option.faxunit | FAX Unit | OFF | OFF |
| . . . | | | |

TABLE 2

Setting Values of Address Book Data Stored in DB of Multifunction Printer

| Address Book ID | Address Type | Address | Display Name |
|---|---|---|---|
| 1 | E-Mail | aaa@xxx.co.jp | Tanaka Taro |
| . . . | | | |

The multifunction printer 120 stores device setting values like ones in Table 1 in the setting value management database 324. In the setting value management database 324, the UI display name, the setting value, and the initial value are stored while being associated with the key identifier by which the setting value can be uniquely specified.

For example, the setting value specified by the key identifier {settings.devic.network.ipaddress} is a setting value for managing the IP address of the multifunction printer 120 and, in a product for Japan, the UI display name of this setting value is {IP Address}. Moreover, the value is currently set to {192.168.111.222}, and the initial value of this value is {255.255.255.255}.

The multifunction printer 120 also has functions such as transmitting the image data inputted from the scanner 231 to the outside by E-Mail via the network, and address book data storing and managing E-Mail Addresses exists in the multifunction printer 120. The address book data is also stored in the setting value management database 324 of the multifunction printer 120 as one type of setting value. In Table 2 in which data managed in an address book function is cut out to facilitate understanding, the address type, the address, and the display name are stored while being associated with the address book ID uniquely managed in the address book function.

For example, in the information on the address book ID of {1}, information for transmitting E-Mail to the address of {aaa@xxx.co.jp} is stored, and {Tanaka Taro} is displayed on the operation unit 221.

Moreover, final synchronization completion time like one depicted in Table 3 is stored in the setting value management database 324.

TABLE 3

| Final Synchronization Completion Time |
|---|
| 2015/2/1 13:00 |

Table 3 is information used in the case where the multifunction printer 120 performs synchronization of the setting value data with the setting value management server 110. Details are described in a synchronization method of the setting value data to be described later.

Next, a configuration of a setting value management server app 310 of the setting value management server 110 is described. The setting value management server app 310 of FIG. 3A is stored in the ROM 208, the HDD 207, and the like on the setting value management server 110, and FIG. 3A is a configuration diagram of an app executed by the CPU 205.

The setting value management server app 310 has a data processing unit 311, a setting value data management unit 312, an application control unit 313, a setting value management database 314, a communication processing unit 315, and a response data management unit 316.

For example, data of Table 4 to Table 8 is stored in the setting value management database 314.

TABLE 4

Setting Values Stored in DB of Setting Value Management Server

| Device Serial No. | Device Code | Version |
|---|---|---|
| 1234567 | iR-ADV C5255 | Ver 00.01 |
| 3124567 | iR-ADV C5240 | Ver 00.02 |
| . . . | | |

In Table 4, the setting value management server app 310 manages the version and the device code by using the serial No. as a searchable unique key such that a client performing the synchronization processing of the setting value via the network 100 can be uniquely identified. The data depicted in Table 4 is stored in the setting value management database 314 of the setting value management server app 310. The serial No. is set such that a product can be uniquely identified, and products are categorized by using the device code. Moreover, the version is a firmware version of each of the multifunction printers associated with the serial Nos.

TABLE 5

All Setting Values of Multifunction Printers Stored in DB of Setting Value Management Server

| Device Serial No. | Setting Value Name | Setting Value | Initial Value | Server Final Update Time |
|---|---|---|---|---|
| 1234567 | settings.device.sirial | 1234567 | "" | 2014/12/31 9:00 |
| 1234567 | settings.device.name | iR-ADV C5255 | "" | 2014/12/31 9:00 |
| 1234567 | settings.device.frmversion | Ver 00.01 | Ver 00.00 | 2015/1/1 10:00 |
| 1234567 | settings.devic.network.ipaddress | 192.168.111.222 | 255.255.255.255 | 2015/1/1 12:00 |
| 1234567 | settings.device.phone.number | 03-0000-1111 | 00-0000-0000 | 2015/2/1 13:00 |
| 1234567 | settings.fax.phone.number | 00-0000-0000 | 00-0000-0000 | 2014/12/31 9:00 |
| 1234567 | settings.license.ipfax | OFF | OFF | 2014/12/31 9:00 |
| 1234567 | settings.option.finisherX | ON | OFF | 2015/1/1 10:00 |
| 1234567 | setting.option.faxunit | OFF | OFF | 2015/1/1 12:00 |
| 3124567 | settings.device.sirial | 1234567 | | 2015/2/1 13:00 |
| ... | | | | |

Moreover, as depicted in Table 5, the setting value management database 324 of the setting value management server manages data of all setting values of the connected multifunction printers. The setting value management server app 310 manages the setting value data of Table 1 notified by the multifunction printer 120 via the network 100 while associating the setting value data with the serial No. of the multifunction printer as depicted in Table 5. In the case where the setting value management server app 310 receives notification of updated or newly-registered setting value data from the multifunction printer 120, the setting value management server app 310 manages each of setting values by associating the time at which the setting value is stored in the server with the setting value as server final update time as depicted in Table 5.

Table 6 to Table 8 also depict setting values stored in the setting value management database 314 of the setting value management server 110. Tables 6 to 8 are described in detail in the synchronization method of the setting value data to be described later.

TABLE 6

Setting Values of Configuration Information of Devices which are Stored in DB of Setting Value Management Server

| Device Serial No. | Enabled License/Option |
|---|---|
| 1234567 | settings.option.finisherX |
| 3124567 | settings.option.faxunit |
| ... | |

TABLE 7

Setting Values of Address Book Information Stored in DB of Setting Value Management Server

| Device Serial No. | Address Book ID | Address Type | Address | Display Name | Server Final Update Time |
|---|---|---|---|---|---|
| 1234567 | 1 | E-Mail | aaa@xxx.co.jp | Tanaka Taro | 2014/12/31 9:00 |
| 1234567 | 2 | FTP | 192.168.222.333 | Shared Server | 2015/2/1 15:00 |
| 1234567 | 3 | FAX | 03-0000-3333 | Yamada Ichiro | 2015/2/1 13:00 |
| 3124567 | 1 | E-Mail | aaa@xxx.co.jp | Tanaka Taro | 2014/12/31 9:00 |
| 3124567 | 2 | FTP | 192.168.222.333 | Shared Server | 2015/2/1 15:00 |
| 3124567 | 3 | FAX | 03-0000-3333 | Yamada Ichiro | 2015/2/1 13:00 |
| ... | | | | | |

TABLE 8

Setting Value of Synchronization Condition Stored
in DB of Setting Value Management Server

| Address Type | Synchronization Condition Setting Value | State |
|---|---|---|
| FAX | setting.option.faxunit | ON |
| ... | | |

Figure 4:
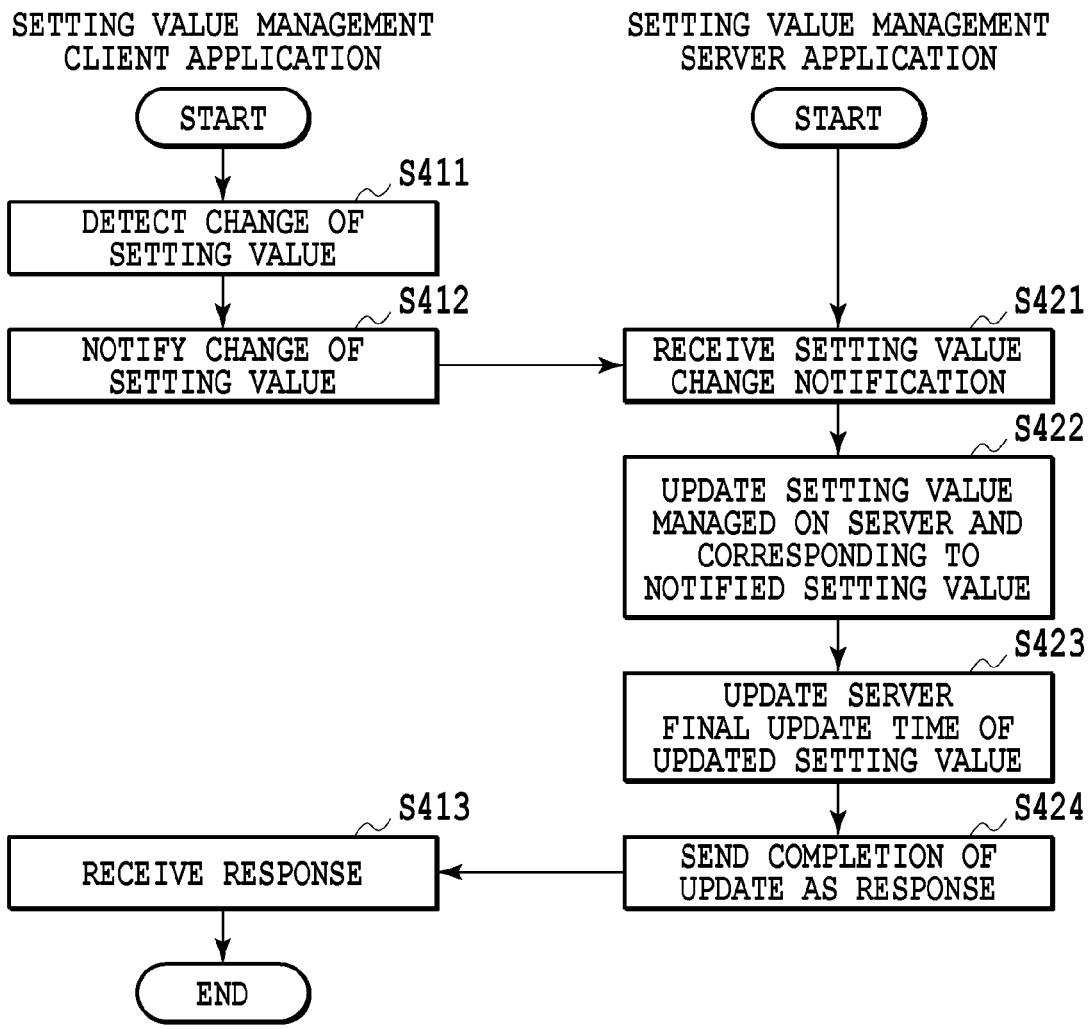
FIG. 4 is a diagram illustrating a flowchart of a data update method in a case where differential synchronization is performed.
Figure 5:
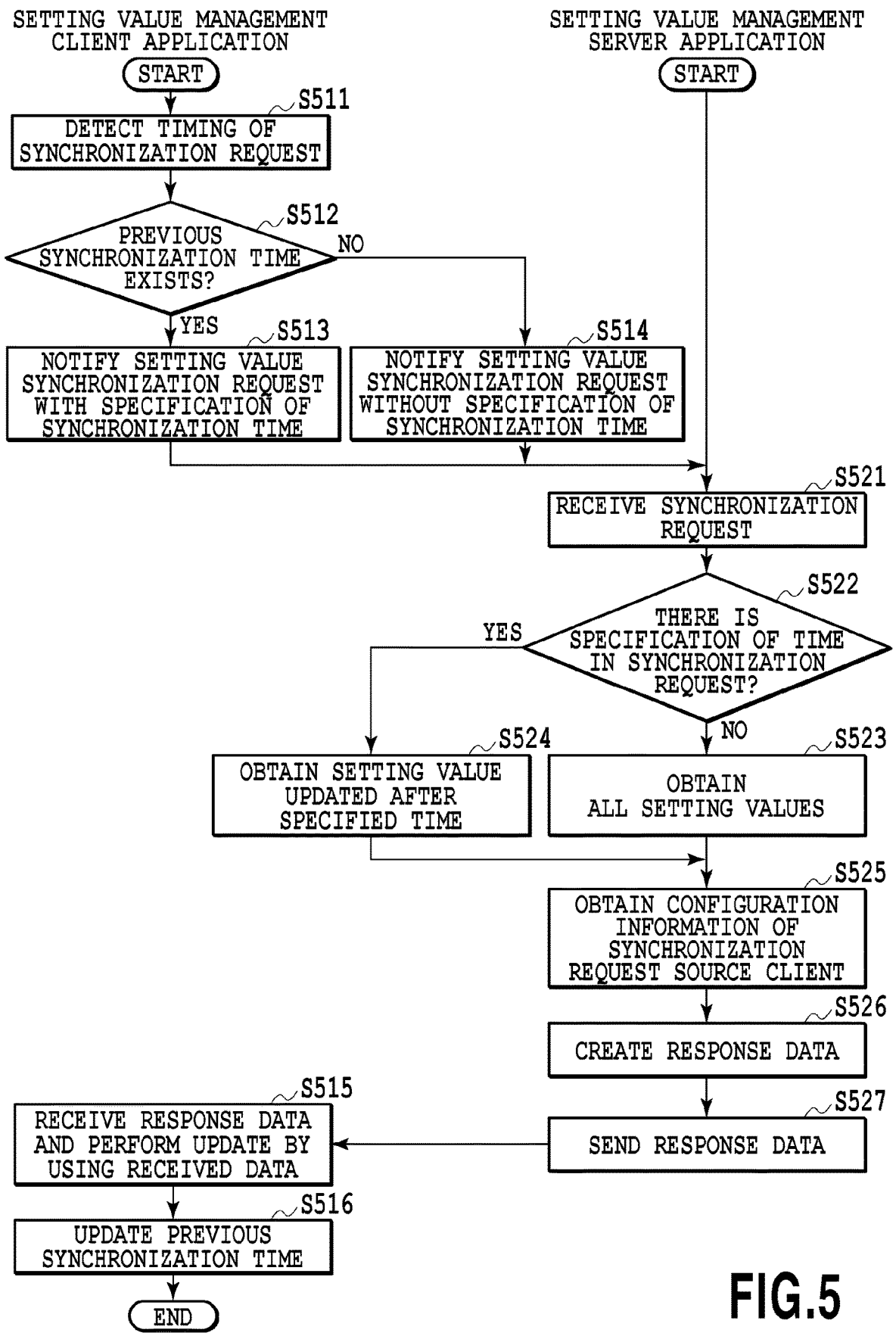
FIG. 5 is a diagram illustrating a flowchart of a data synchronization method in a case where the differential synchronization is performed.

Next, normal synchronization processing performed in the configuration described above is explained by using FIGS. 4 and 5. FIGS. 4 and 5 are flowcharts in the case where the setting value management server app 310 of FIG. 3A and the setting value management client app 320 of FIG. 3B actually perform synchronization of the setting value data. Here, processing between the multifunction printer 120 and the setting value management server 110 is described as an example. Note that the same processing is performed as processing between any multifunction printer and the setting value management server 110. An actual method of the synchronization processing of the setting value data is described with reference also to Tables 1 to 8.

Description is given of a specific example in which the serial No. of the multifunction printer 120 is {1234567} and the address book data registered in each of multifunction printers is handled as common setting values. The common setting values are setting values common among apparatuses (including a server and clients) in the synchronization system. In other words, description is given of an example in which the address book data is handled as data common among the apparatuses. For example, once the address book data on a certain person is updated in the multifunction printer 120, the address book data of the other multifunction printer 121 is resultantly synchronized and updated. Specific processing is described below.

First, processing for prerequisites in the synchronization system is described. In the case where the setting value management client app 320 is connected to the setting value management server app 310 via the network 100 for the first time, the setting value management client app 320 sends the setting value management server app 310 all data of the setting value management database 324. In FIG. 4, it is assumed that the setting value management client app 320 has been already connected to the setting value management server app 310, and all data of the setting value management database 324 has been already sent to the setting value management server app 310.

Assume that a user changes a setting value of the multifunction printer 120 after the aforementioned processing. In step S411, the setting value data management unit 322 of the setting value management client app detects the change of the setting value via the data processing unit 321. After the detection of the change of the setting value, in step S412, the application control unit 323 requests the communication processing unit 325 to perform processing of notifying the setting value change, and the communication processing unit 325 notifies the setting value change to the setting value management server app 310.

In step S421, the communication processing unit 315 of the setting value management server app 310 receives the notification of the setting value change from the setting value management client app 320 via the network 100.

In step S422, the application control unit 313 updates a setting value managed on the server and corresponding to the notified setting value. First, the communication processing unit 315 notifies the received setting value to the application control unit 313. The application control unit 313 updates the setting value of the setting value management database 314 via the setting value data management unit 312 and the data processing unit 311. Next, in step S423, the setting value data management unit 312 requests the data processing unit 311 to update the server final update time of the updated setting value, and the update is executed. In step S423, in the case where the updated setting value is a common setting value, common setting values stored in all of connected multifunction printers in association with the updated setting value and the server final update time thereof are updated together.

This operation is described by giving a specific example. For example, assume that setting values are stored in the setting value management database 314 of the setting value management server app as in Table 7. In Table 7, common setting values are stored while being associated with each of the serial devices No. In the case where the setting value whose update is notified in step S421 is the setting value of the address book ID {03} and the update notification is made at 2015/2/1 13:00, the setting value of the address book ID {3} in all of multifunction printers and the server final update time thereof are updated. Table 7 depicts the setting value which has been already updated.

After completion of the aforementioned update processing, in step S424, the application control unit 313 requests the communication processing unit 315 to send a response indicating the completion of the update processing. The communication processing unit 315 sends the setting value management client app 320 the completion of the update processing via the network 100 as a response.

In step S413, the communication processing unit 325 of the setting value management client app 320 notifies reception of the response of the update processing completion to the application control unit 323. Then, the update processing of the setting value is completed.

In the embodiment, since the setting values are synchronized between the multiple multifunction printers (client devices) as described above, the setting value management client app performs the synchronization processing at regular timings. FIG. 5 is a flowchart illustrating a flow of the synchronization processing performed at regular timings.

In step S511, the application control unit 323 of the setting value management client app detects a timing of synchronization request. In step S511, the application control unit 323 detects the timing of synchronization request at coming of the regular synchronization processing timing. At coming of the regular synchronization request timing, in step S512, the application control unit 323 determines whether stored previous synchronization time (final synchronization completion time) exists as in Table 3. The previous synchronization time is time at which the previous synchronization of the setting value is performed.

If the previous synchronization time exists, the flow proceeds to step S513, and the application control unit 323 requests the communication processing unit 325 to send a setting value synchronization request with specification of synchronization time. The communication processing unit 325 notifies the setting value synchronization request with specification of synchronization time to the setting value management server app 310 via the network 100.

Meanwhile, if the previous synchronization time does not exist, the flow proceeds to step S514 and the application control unit 323 requests the communication processing unit 325 to send a setting value synchronization request without specifying the synchronization time. The communication processing unit 325 notifies the setting value synchronization request without specification of synchronization time to the setting value management server app 310.

In step S521, the communication processing unit 315 of the setting value management server app 310 receives the synchronization request and notifies the request to the application control unit 313. In step S522, the application control unit 313 determines whether there is specification of time in the notified synchronization request.

If there is no specification of time, the flow proceeds to step S523. The application control unit 313 requests the setting value data management unit 312 to obtain all setting values which are stored in the setting value management database 314 and which are related to the device being the request source. Then, the application control unit 313 obtains the setting value data via the data processing unit 311. In the embodiment, setting value data of all setting values related to the device being the request source is setting information including (i) setting values whose types correspond to the changed configuration of the client device and which are not updated after the change of the configuration, and (ii) setting values whose type correspond to the changed configuration of the client device and which are updated after the change of the configuration.

Meanwhile, if the synchronization time is specified, the flow proceeds to step S524. The application control unit 313 requests the setting value data management unit 312 to obtain, out of the setting values stored in the setting value management database 314 and related to the device being the request source, a setting value whose associated server final update time is after the specified time. Then, the application control unit 313 obtains the setting value data via the data processing unit 311.

Next, in step S525, the application control unit 313 sends a request to the setting value data management unit 312, and obtains configuration information of the multifunction printer which has made the synchronization request, from the setting value management database 314 via the data processing unit 311. The configuration information of each of connected clients which is stored in the setting value management database 314 is stored as in Table 6, and enabled states of functions are managed in correspondence with the device serial Nos. For example, it can be confirmed from Table 6 that a FAX unit is connected for the device serial No. {3124567} but no Fax unit is connected for the device serial No. {1234567}.

In step S526, the application control unit 313 requests the response data management unit 316 to create response data from the setting value data obtained in step S522 or step S523, based on the configuration information of the client. The response data management unit 316 creates the response data to be sent to the multifunction printer 120 having made the synchronization request. At this time, the response data management unit 316 creates the response data by obtaining information on synchronization conditions in Table 8 via the data processing unit 311, the information stored in setting value management database 314.

For example, assume that the time specified in step S522 is 2015/2/1 12:59. In other words, the setting value management server app is assumed to have received a setting value synchronization request with specification of synchronization time. The time specified in step S522 is the previous synchronization time specified by the multifunction printer 120. Specifically, as described in step S524, data updated after the previous synchronization time is candidates of an update target. In this case, data obtained as candidates of an update target in the setting values of the address book information of Table 7 is data of address book IDs {2} and {3}. The response data management unit 316 checks a setting value of a synchronization condition in Table 8. It is found from the information of Table 8 that a setting value whose address type is FAX in the address book information is set as a synchronization target in the case where the state of {setting.option.faxunit} is ON. The response data management unit 316 determines a setting value to be the synchronization target, out of the candidates of an update target, based on the information of Table 8. Referring to the configuration information on the managed devices in Table 6, it is found that no FAX unit is connected to the multifunction printer 120 with the device serial No. {1234567}. Accordingly, the response data management unit 316 creates synchronization response data to the device serial No. {1234567} such that no address book ID {3} whose address type is FAX is included in the response data and only the address book ID {2} is sent as the response. As described above, the response data management unit 316 creates the response data by extracting the setting value to be the synchronization target out of the setting values being the update target candidates, according to the configuration and state of each multifunction printer. In other words, the response data management unit 316 creates the response data according to the configuration and state of each multifunction printer such that no setting value which is not the synchronization target is included in the response data. As described above, an operation is performed such that, in the case where a certain function or configuration of a device is disabled, data related to this function or configuration is not set as the synchronization target data, even if the data is updated after the previous synchronization time. The reason for this is that, for example, in some cases, the multifunction printer determines a disabled state of a function X of the multifunction printer by referring to an initial value of a setting value related to the function X, and failures sometimes occur if the initial value is updated in the disabled state of the function X.

Next, returning to the description of the flow, in step S527, the application control unit 313 requests the communication processing unit 315 to send the response data created by the response data management unit 316. The communication processing unit 315 sends the response data to the setting value management client app via the network 100.

In step S515, the communication processing unit 325 of the setting value management client app 320 receives notification of the response data. The communication processing unit 325 notifies the reception of the response data to the application control unit 323, and the application control unit 323 updates the setting value of the setting value management database 324.

Lastly, in step S516, the application control unit 323 updates the final synchronization completion time like one depicted in Table 3 and refers to its value in the next synchronization request.

Note that the case where the previous synchronization time does not exist in the description of FIG. 5 is mainly a case where, for example, the setting value management client app 320 sends the synchronization request to the setting value management server app 310 for the first time.

The description of a mode of performing the normal synchronization processing in the setting value synchronization system has been given above. Next, description is given of a point that the synchronization is sometimes not successfully performed in the aforementioned setting value update and synchronization processing flow in FIGS. 4 and 5. Specifically, description is given of the case where mismatching occurs between a setting value managed by the server and a setting value managed by the client.

For example, assume that the processing of FIG. 5 is performed multiple times in the multifunction printer 120 and the value of {2015/2/1 15:00} is stored in step S516 as the previous synchronization time. Then, assume that a FAX unit is installed in the multifunction printer 120 with the device serial No. {1234567} and the state of {setting.option.faxunit} is set to {ON}. In the case where the setting value management client app 320 of the multifunction printer 120 performs the synchronization request at a timing of synchronization request after the installing of the FAX unit, the setting value data whose address book ID is {3} is not set as a synchronization target in the processing flow of FIG. 5. This is because the server final update time of the address book ID {3} is before the previous synchronization time, and the setting value management server app 310 thus determines that the address book ID {3} has been already synchronized. As a result the setting value of the address book ID {3} is not obtained as a candidate for an update target in step S524, and is thus not included in the response data.

In the following Examples 1 to 3, various examples for solving such a problem are described.

Example 1

Figure 6:
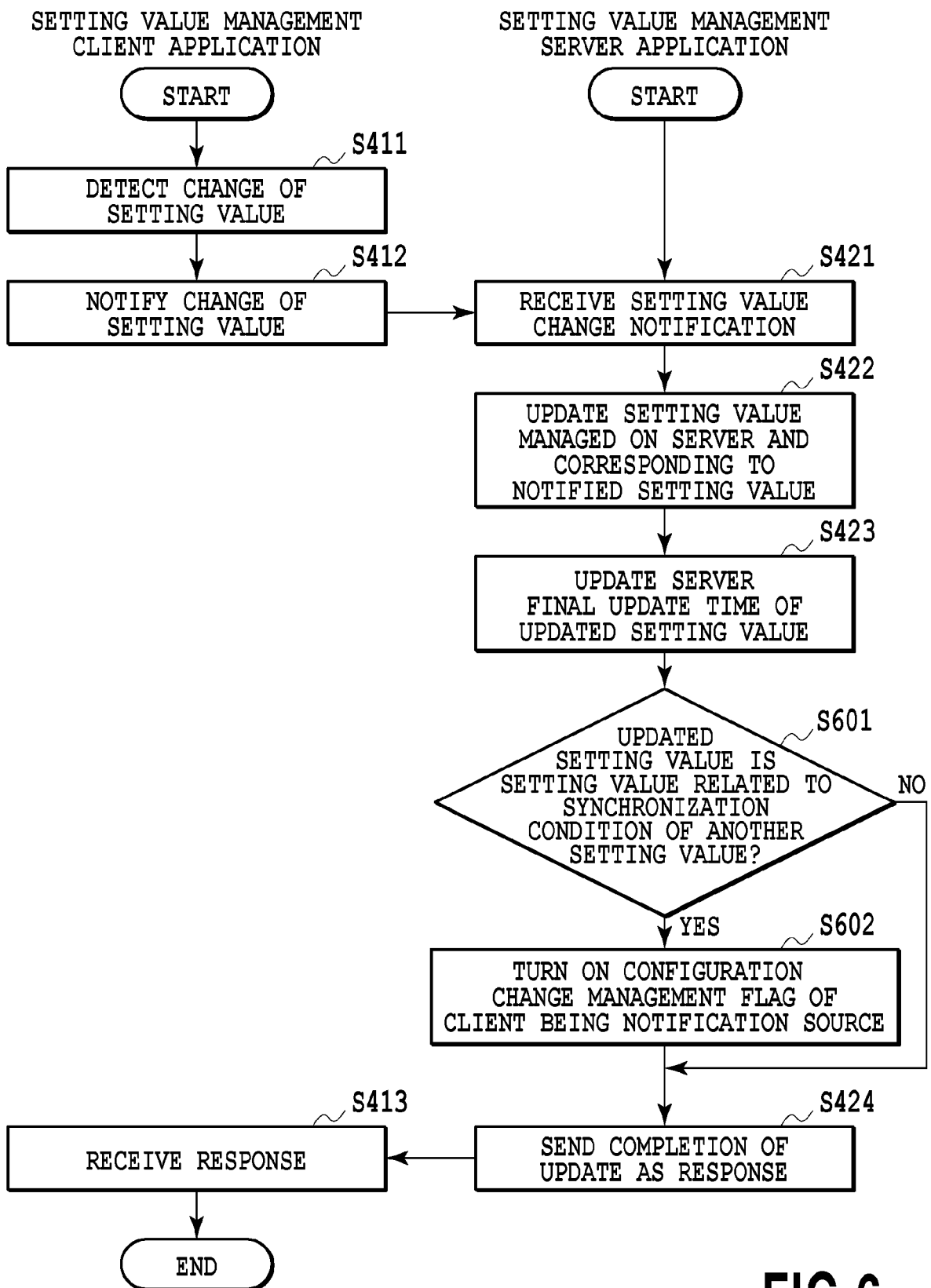
FIG. 6 is a diagram illustrating a flowchart of setting value update in Example 1.

Processing of Example 1 is described by using FIGS. 6 and 7. Regarding a data configuration, a configuration like one depicted in Table 9 is held in the setting value management database 314. In Table 9, an item of configuration change management flag is added to the data items of Table 4 stored in the setting value management server app 310.

TABLE 9

Setting Values Stored in DB of Setting Value Management Server

| Device Serial No. | Device Code | Version | Configuration Change Management Flag |
|---|---|---|---|
| 1234567 | iR-ADV C5255 | Ver 00.01 | OFF |
| 3124567 | iR-ADV C5240 | Ver 00.02 | OFF |
| ... | | | |

Next, the processing of the flowchart of FIG. 6 is described while focusing on differences from FIG. 4. Steps of the flowchart which are the same processing as the processing of FIG. 4 are denoted by the same reference numerals as in FIG. 4, and detailed description thereof is omitted herein.

In FIG. 6, as in FIG. 4, there is performed processing in which the setting value management client app 320 detects change of a setting value and notifies the change to the setting value management server app 310. In step S601, the setting value management server app 310 determines whether the setting value updated in step S422 is a setting value related to a synchronization condition of another setting value. If the setting value management server app 310 determines that the setting value is a setting value related to a synchronization condition of another setting value, the flow proceeds to step S602. In step S602, the setting value data management unit 312 of the setting value management server app turns ON a configuration change management flag which is managed in Table 9 and which is associated with the client (device serial No.) having made the update request. Then, the flow proceeds to step S424.

For example, the setting value management server app 310 performs setting value data management of managing synchronization conditions as in Table 8. In the case where the setting value updated in step S422 involves changing of a synchronization condition setting value like one depicted in Table 8, the setting value can be determined to be a setting value related to the synchronization condition of "address type: FAX" which is another setting value in the example of Table 8. For example, in the case where the update notification of the setting value received from the device serial No. {1234567} is notification of setting {setting.option.faxunit} to {ON}, the configuration change management flag of the device serial No. {1234567} in Table 9 is turned ON.

Figure 7B:
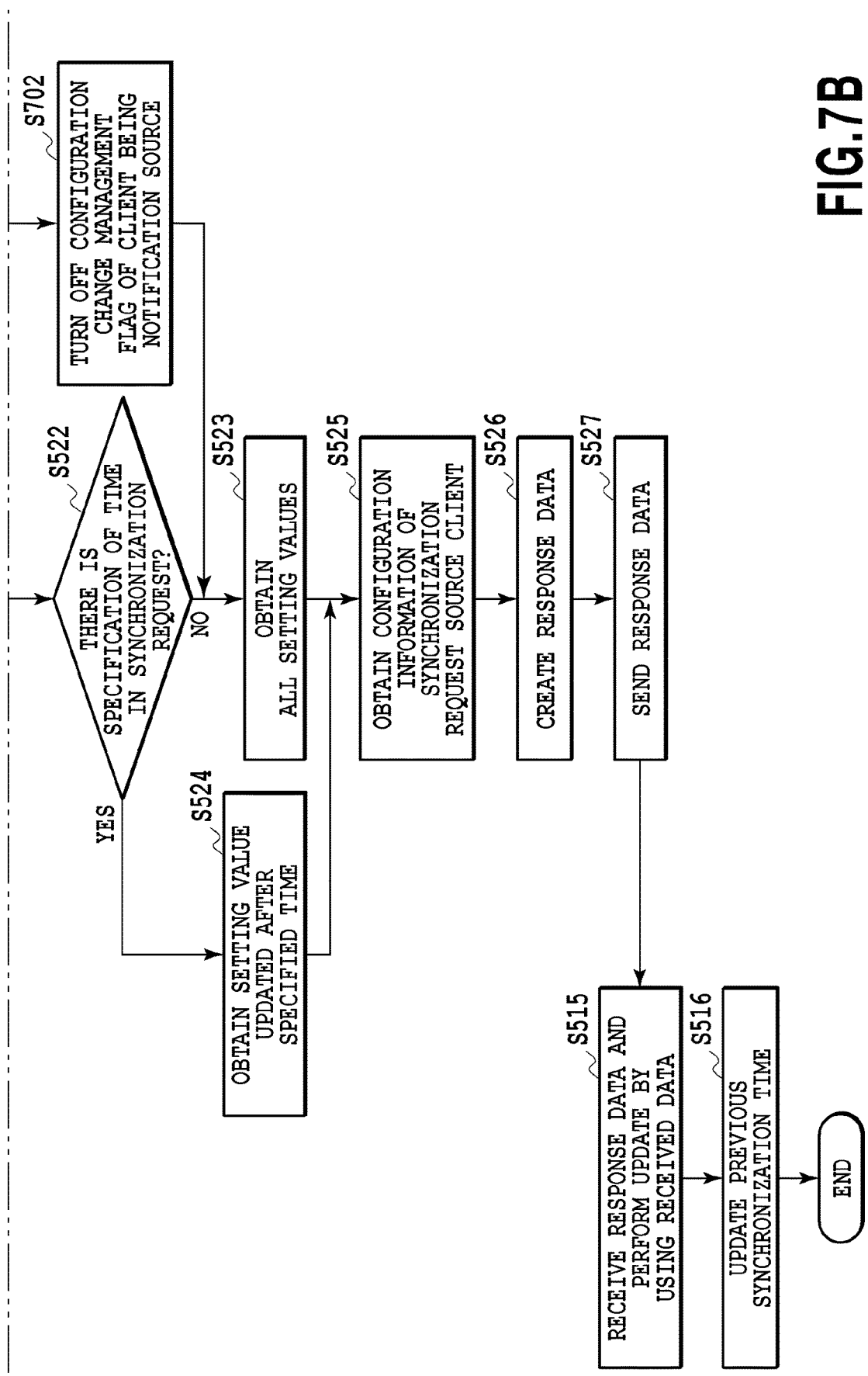

Next, the processing of the flowchart of FIGS. 7A and 7B is described while focusing on differences from FIG. 5. In FIGS. 7A and 7B, as in FIG. 5, there is performed processing in which the setting value management client app 320 sends a synchronization request and the setting value management server app 310 sends response data in response to the synchronization request. Steps of the flowchart which are the same processing as the processing of FIG. 5 are denoted by the same reference numerals as in FIG. 5, and detailed description thereof is omitted herein.

The setting value management client app 320 regularly sends a synchronization request. Upon receiving the synchronization request, the setting value management server app 310 refers to setting value data stored as in Table 9 and determines whether the configuration change management flag of the device having made the synchronization request is ON in step S701. If the configuration change management flag of the device having made the synchronization request is ON, the flow proceeds to step S702, and the setting value data management unit 312 turns OFF the configuration change management flag of the device corresponding to the setting value management client app 320 being the notification source. Then, the flow proceeds to step S523, and the application control unit 313 obtains all setting values related to the device having made the synchronization request as described in FIG. 5. Thereafter, as in FIG. 5, the setting value management server app 310 generates the response data by referring to the configuration information of the client being the synchronization request source.

As described above, in the case where there is change of a setting value which affects a synchronization condition of another setting value in the configuration in which the differential synchronization is performed, all setting values are synchronized. This can prevent occurrence of mismatching between data stored in the setting value management server app 310 and data stored insetting value management client app 320. Moreover, since the synchronization processing is performed in the same way as in the case where the setting value management client app 320 sends the synchronization request to the setting value management server app 310 for the first time, complete data synchronization with data managed by the server can be performed. In addition, the response data can be created in the setting value management server app 310 without considering relationships among pieces of data.

Example 2

Next, Example 2 is described. In Example 1, description is given of the following example: in the case where the multifunction printer 120 sends a synchronization request after update of the device configuration information of the multifunction printer 120, the setting value management server app 310 creates response data with all data related to this device (multifunction printer 120) being set as the synchronization target. In other words, description is given of the following example: the setting value management server 110 determines a device in which change of a setting value affecting a synchronization condition of another setting value is made, and all data is then set as the synchronization target in the case where this device sends the synchronization request.

Meanwhile, in Example 2, description is given of an example of preventing mismatching of synchronization data by changing the processing in the multifunction printer 120 being a client, without changing the processing in the setting value management server 110.

Figure 8:
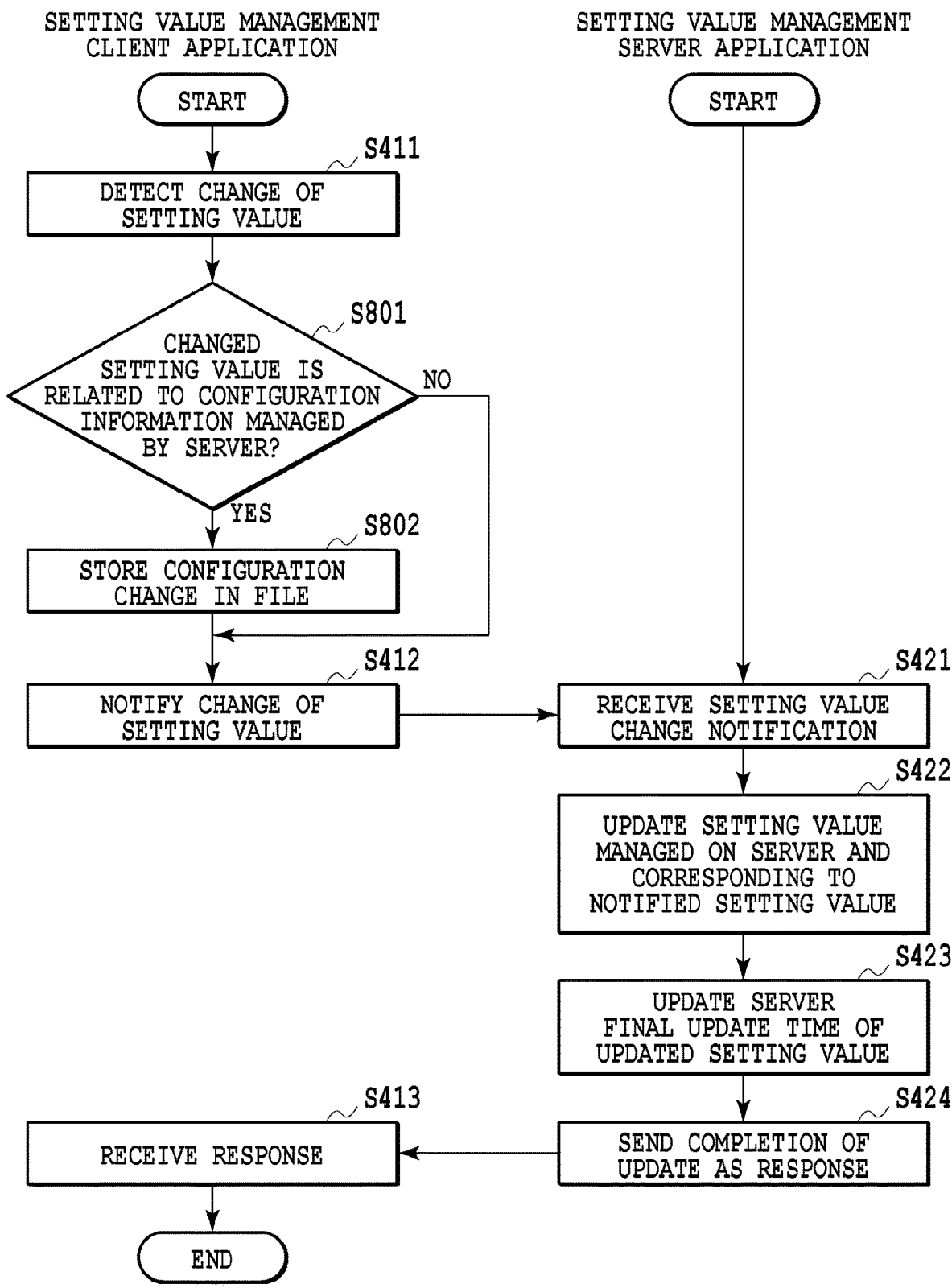
FIG. 8 is a diagram illustrating a flowchart of setting value update in Example 2.

The processing of the flowchart of FIG. 8 is described while focusing on differences from FIG. 4. Steps of the flowchart which are the same processing as the processing of FIG. 4 are denoted by the same reference numerals as in FIG. 4.

The setting value management client app 320 detects change of a setting value in step S411, and performs processing of step S801 before notifying update to the setting value management server app 310 in step S412. In step S801, the setting value data management unit 322 determines whether the setting value changed in step S411 is a setting value related to the configuration information. Then, if the changed setting value is related to the configuration information, the flow proceeds to step S802, and the setting value data management unit 322 additionally stores a file indicating the change.

The determination of whether the changed setting value is a setting value related to the configuration information can be performed by, for example, the setting value data management unit 322 determining based on a setting value name of a device setting value in Table 1. For example, the key identifier of the FAX unit is {setting.option.faxunit}. As described above, the setting value data management unit 322 may use a searchable key identifier with which, in the case where there is change in {setting.option.*}, this change can be identified as change of a setting value related to the configuration information.

Alternatively, the setting value management client app 320 may store setting value data like one corresponding to Table 8 which is stored in the setting value management server app 310 and which is managed by the setting value management server app, in the setting value management database 324. As another alternative, a table in which a key identifier corresponds to configuration management data may be additionally stored in the setting value management database 324.

Specifically, in the case where {setting.option.faxunit} is set to {ON}, the setting value data management unit 322 requests the application control unit 323 to perform processing. The application control unit 323 stores the file indicating the change in an external storage unit (HDD 207 or RAM 206) or the like via the system bus 230.

Next, the processing of the flowchart of FIGS. 9A and 9B is described while focusing on differences from FIG. 5. Steps of the flowchart which are the same processing as the processing of FIG. 5 are denoted by the same reference numerals as in FIG. 5.

In the case where the coming of the regular synchronization timing is detected in step S511, the flow proceeds to step S901, and the application control unit 323 of the setting value management client app determines whether a file indicating change in the configuration exists. For example, the application control unit 323 determines whether a file indicating change in the configuration and stored in the external storage unit via the system bus 230 exists.

If a file indicating change in the configuration exists, the flow proceeds to step S514, and the application control unit 323 sends the "synchronization request without specification of the previous synchronization time" which is notified in the regularly-made synchronization request. In other words, the application control unit 323 sends the same synchronization request (request of sending back all setting values as a response) as in the case where the application control unit 323 determines that the previous synchronization time does not exist in step S512. The setting value management server app 310 thereby sends back a response of all setting values based on the configuration information of the client, after receiving the synchronization request (see steps S523 and S525).

Thereafter, the setting value management client app 320 receives the response data from the setting value management server app 310, performs update of data (S515) and update of previous synchronization time (S516), and then performs processing of step S902. In step S902, the application control unit 323 determines whether a file indicating change in the configuration exists in the synchronization request flow. In the case where a file indicating change in the configuration exists, the application control unit 323 deletes the file indicating change in the configuration in step S903.

In the example, exchange of data via the network 100 is performed. Accordingly, a response of error is sometimes received due to some reason (not illustrated). Thus, existence of a file indicating change in the configuration is checked and deleted in the flow of the same synchronization request.

As described above, in Example 2, synchronization maintaining consistency with the setting value management server app can be performed without changing the configuration of the setting value management server, by causing the setting value management client app 320 to detect a configuration change of the client and sends a synchronization request for all data.

Example 3

Next, Example 3 is described. In Example 1, description is given of the following example: the setting value management server determines occurrence of change in the configuration and performs synchronization of all data related to a device in which the configuration is changed. In Example 3, description is given of the following example: the setting value management server app 310 determines a setting value to be a synchronization target in advance, instead of performing synchronization of all data related to the device in the case where the setting value management server app 310 detects change in the configuration information.

Example 3 is described below while focusing on differences from Example 1.

In Example 3, setting values are stored in the setting value management database 314 of the setting value management server app with an item of forced synchronization flag added to the setting value data of Table 7 as depicted in Table 10.

TABLE 10

Setting Values of Address Book Information Stored
in DB of Setting Value Management Server

| Device Serial No. | Address Book ID | Address Type | Address | Display Name | Server Final Update Time | Forced Synchronization Flag |
|---|---|---|---|---|---|---|
| 1234567 | 1 | E-Mail | aaa@xxx.co.jp | Tanaka Taro | 2014/12/31 9:00 | OFF |
| 1234567 | 2 | FTP | 192.168.222.333 | Shared Server | 2015/2/1 15:00 | OFF |
| 1234567 | 3 | FAX | 03-0000-3333 | Yamada Ichiro | 2015/2/1 13:00 | OFF |
| 3124567 | 1 | E-Mail | aaa@xxx.co.jp | Tanaka Taro | 2014/12/31 9:00 | OFF |
| 3124567 | 2 | FTP | 192.168.222.333 | Shared Server | 2015/2/1 15:00 | OFF |
| 3124567 | 3 | FAX | 03-0000-3333 | Yamada Ichiro | 2015/2/1 13:00 | OFF |
| ... | ... | | | | | |

Figure 10:
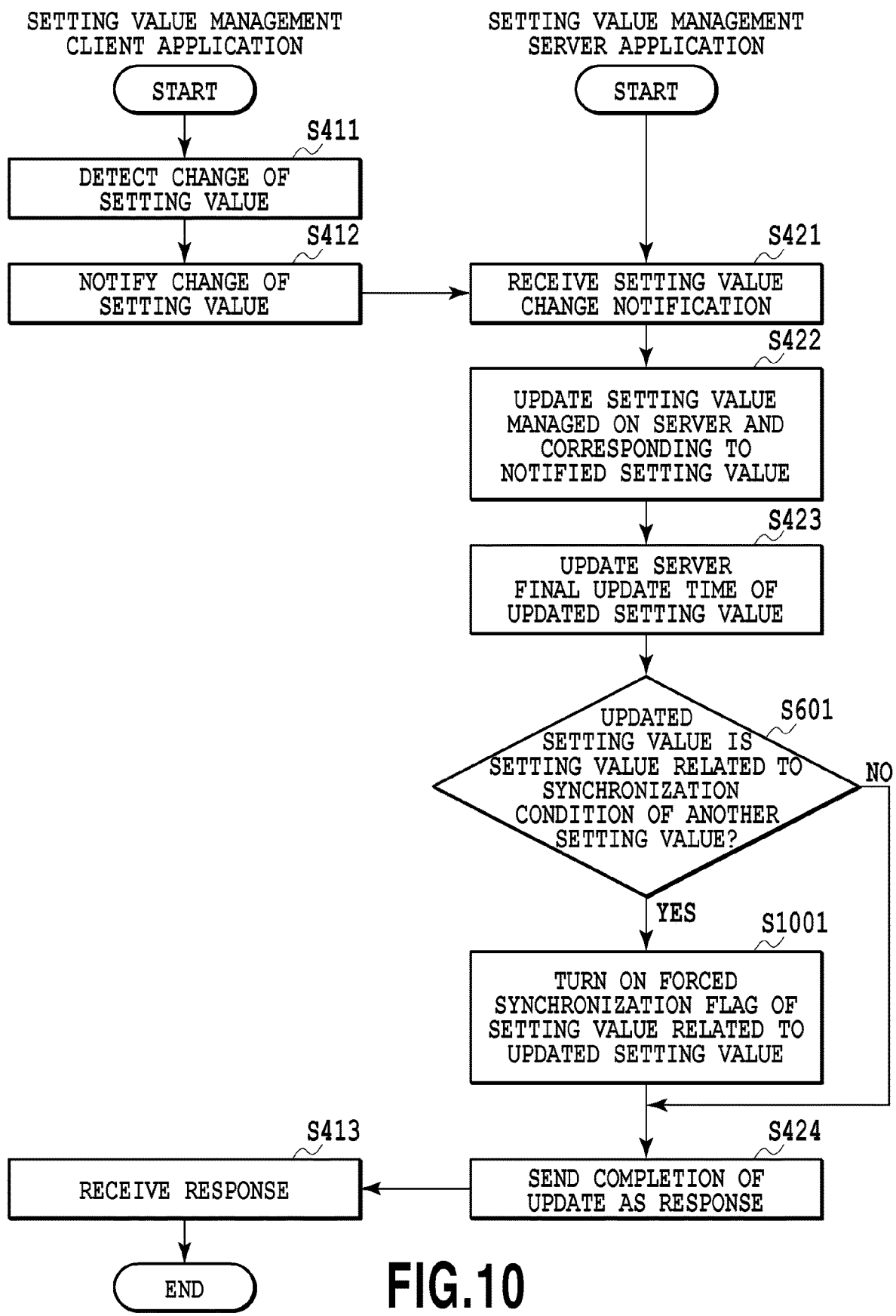
FIG. 10 is a diagram illustrating a flowchart of setting value update in Example 3.

The processing of the flowchart of FIG. 10 is described while focusing on differences from FIGS. 4 and 6. Steps of the flowchart which are the same as the processing of FIGS. 4 and 6 are denoted by the same reference numerals as in FIGS. 4 and 6.

In the case where an updated setting value is determined to be a setting value related to a synchronization condition of another setting value in step S601 of the processing of the setting value management server app 310, the setting value data management unit 312 causes the flow to proceed to step S1001. In step S1001, the setting value data management unit 312 sets a forced synchronization flag of each of related setting values to {ON}.

The setting value management server app 310 performs, for example, setting value data management of managing synchronization conditions like one in FIG. 8. In the case where update notification of a setting value received from the device serial No. {1234567} is notification of setting {setting.option.faxunit} to {ON}, the forced synchronization flag of the setting value data whose address type is {FAX} in Table 10 is set to {ON}.

Next, the processing of the flowchart of FIGS. 11A and 11B is described while focusing on differences from FIG. 5. Steps of the flowchart which are the same as the processing of FIG. 5 are denoted by the same reference numerals as in FIG. 5.

After a setting value is obtained as a result of performing time comparison in step S524 in the processing of the setting value management server app, the flow proceeds to step S1101. In step S1101, the setting value data management unit 312 obtains setting values whose forced synchronization flags are ON, in addition to the setting value obtained in step S524. Then, in step S1102, the setting value data management unit 312 sets the forced synchronization flags of the setting values obtained in step S1101 to {OFF} after obtaining the setting values. Thereafter, as in FIG. 5, the setting value management server app 310 sends the setting value data as a response, based on the configuration information of the client being the synchronization request source.

Thus, in the case where a setting value related to the configuration information of a device is changed, instead of performing synchronization of all data, synchronization can be performed while taking in consideration of correspondence to setting values to be affected by the change.

Modified Example

In Examples 1 to 3, description is given of the example in which actual data exists for each of clients even if the data is common setting value data as depicted in Table 7. However, the present invention can be applied also to the case where common setting value data is managed as one piece of actual common setting value data. Moreover, the flags described in the aforementioned examples may be time information. For example, as a method of explicitly showing completion of synchronization to multiple clients in a mode where a common setting value is managed as one piece of actual data, time at which the common setting value is sent as a response to each client in response to the synchronization request may be managed in the setting value management server app. In other words, the common setting value may be managed by being associated with server response time at which the setting value is sent as a response to the synchronization request from the client, in addition to the server final update time which is the update time of the setting value from the client. The server response time is managed, for example, by being further associated with a setting value for each client as depicted in Table 4. In other words, the setting value management server app manages the response time for the synchronization request (server response time) for each client. In the case where the setting value management server receives a synchronization request from a client specifying time before the server response time, the configuration in the client may be changed. In view of this, in the case of receiving such a synchronization request, the setting value management server may perform processing of sending all setting values as a response or sending setting values related to the configuration change as a response, irrespective of the server final update time.

Example 4

In Examples 1 to 3, description is given of the examples of processing in which the setting value management server application performs synchronization of setting values managed for each device. However, as a method of managing setting values which is performed by the setting value management server app, there is a method of managing setting values for each user. For example, in a multifunction printer which is a client and which performs login management, there is a case where initial values for certain processing is managed for each user. In Example 4, description is given of an example in which such setting values for each user are subjected to synchronization processing between the setting value management server and each client.

User information is managed in the setting value management database 314 of the setting value management server application as depicted in Table 11, and user information is managed in the setting value management database 324 of the setting value management client application as depicted in Table 12.

TABLE 11

User Information Stored in DB of Setting Value Management Server

| User ID | User Name |
|---|---|
| 1 | Administrator |
| 2 | userA |
| ... | |

TABLE 12

User Information Stored in DB of Setting Value Management Client

| User ID | User Name | Final Synchronization Time |
|---|---|---|
| 1 | Administrator | 2015/2/1 13:01 |
| 2 | userA | 2015/2/1 15:00 |
| ... | | |

In Examples 1 to 3, description is given of the examples in which each setting value management client application manages the final synchronization time at which each client has performed the last synchronization processing, as the final synchronization time managed by each setting value management client application described in Examples 1 to 3. In the example, each setting value management client application manages the final synchronization time for each user as depicted in Table 12 to adapt to setting values for each user. Note that the final synchronization time for each user is the final synchronization time in each client. In other words, different synchronization time may be managed for the same user in another client.

As depicted in Table 13, a table managing setting values for each user exists in the setting value management database 314 of the setting value management server application.

TABLE 13

Setting Values Set by Each User for User and Stored in DB of Setting Value Management Server

| User ID | Related Data Identifier | Setting Value | Server Final Update Time |
|---|---|---|---|
| 1 | license.application.AddressBook | {Address Type: E-Mail, Address: aaa@xxx.co.jp, Display Name: Tanaka Taro | 2014/12/31 9:00 |
| 1 | license.application.AddressBook | {Address Type: FTP, Address: 192.168.222.333, Display Name: Shared Server | 2015/2/1 15:00 |
| 1 | license.application.Copy | Default Setting {Color Setting: Black and White, Density: 105% | 2015/2/1 13:00 |
| 2 | license.application.AddressBook | {Address Type: FAX, Address: 03-000-333, Display Name: Yamada Ichiro | 2015/2/1 13:00 |
| 2 | license.application.ScanToSend | Default Setting {FileFormat: PDF, CC: aaa@xxx.co.jp} | 2015/2/1 13:00 |
| ... | | | |

Moreover, Table 14 depicts an example of device configuration information in the example. Table 6 described in Example 1 depicts an example in which whether the finisher and the FAX unit of each device are enabled or not is indicated. Table 14 in the example depicts an example in which whether the address book, a copy function, a function of scan-to-send, and the like are enabled or not is indicated.

TABLE 14

Setting Values of Configuration Information of Devices Stored in DB of Setting Value Management Server

| Device Serial No. | Enabled License/Option |
|---|---|
| 1234567 | license.application.AddressBook |
| 1234567 | license.application.Copy |
| 3124567 | license.application.AddressBook |
| 3124567 | license.application.Copy |
| 3124567 | license.application.ScanToSend |
| ... | |

Description is given below of synchronization processing performed in the case where the device configuration information is registered as in Table 14. As described above, Table 11 is setting value information for managing users and is stored in the setting value management database 314 of the setting value management server application. Moreover, Table 13 manages personal settings set by the users corresponding to Table 11.

For example, in order to check a default setting value of an application "scan-to-send" at activation thereof for the user name "userA," a user ID corresponding to the user name "userA" is first checked in Table 11. Then, a related data identifier "license.application.ScanToSend" corresponding to the checked user ID is checked in Table 13. Specifically, since the user ID corresponding to "userA" is "2," the related data identifier "license.application.ScanToSend" corresponding to the user ID "2" is checked in Table 13. The default setting value of the application "scan-tosend" at activation thereof for "userA" is stored in Table 13. According to Table 13, in the case where "userA" activates the application "scan-to-send," a setting value is set such that a file format for sending a scanned image is a PDF format. Moreover, a setting value for setting CC. of a destination to aaa@xxx.co.jp in the activation is set. It is found from the effective license/option of Table 14 that a device in which the "scan-to-send" function enabled is the device "3124567" for which "license.application.ScanToSend" is enabled.

In the case where setting values managed for each user as depicted in Table 13 are synchronized among the clients via the server, the user does not have to newly perform set-up for each client and the usability is thereby improved. However, there is a case where the device configuration information as depicted in Table 14 changes, for example, a case where the application "scan-to-send" is changed from a disabled (not-installed) state to an enable state in a certain client X. In such a case, if the differential synchronization processing of synchronizing differences after the final update time is performed, the setting values may sometimes not be appropriately synchronized as in Example 1. In the example, description is given of a mode in which appropriate synchronization processing is performed also for the setting values managed for each user.

The configuration information of Table 14 is updated in the processing depicted in the flows of FIGS. 6 and 8 as in the description given for Table 6. Specifically, in the case where the device configuration information of Table 14 (for example, the setting value indicating whether the application "scan-to-send" is effective) is changed, the setting value management client application notifies the change of setting value to the setting value management server application (S412). Moreover, the update target is not limited to the device configuration information. In the case where the user logging into a certain client changes setting values for the user like ones depicted in Table 13, the setting value management client application notifies the change of setting values to the setting value management server application (S412).

Moreover, regarding the synchronization processing of setting values for each user, the setting value management server application has a function of, in the case where the user logs into a certain device, determining setting values to be targets of synchronization in the login device (client) (S525). For example, in the case where the application "scan-to-send" is disabled in a device which the user logs into, the setting values (initial values at activation) related to the application "scan-to-send" are not determined to be the synchronization targets even if the setting values are changed in another device.

In the setting value management application, setting values are managed as in Table 15, in correspondence with the items in Table 13, excluding the server final update time.

TABLE 15

Setting Values Set by Each User for User and Stored in DB of Setting Value Management Client

| User ID | Related Data Identifier | Setting Value |
|---|---|---|
| 1 | license.application.AddressBook | {Address Type: E-Mail, Address: aaa@xxx.co.jp, Display Name: Tanaka Taro |
| 1 | license.application.AddressBook | {Address Type: FTP, Address: 192.168.222.333, Display Name : Shared Server |

TABLE 15-continued

Setting Values Set by Each User for User and Stored in DB of Setting Value Management Client

| User ID | Related Data Identifier | Setting Value |
|---|---|---|
| 1 | license.application.Copy | Default Setting {Color Setting: Black and White, Density: 105%} |

A synchronization request timing of the setting values managed for each user is a timing at which the user logs into a device to be used. For example, in the case where the user logs into a device X, the device X serves as a client to notify the synchronization request to the setting value management server application.

Figure 12B:
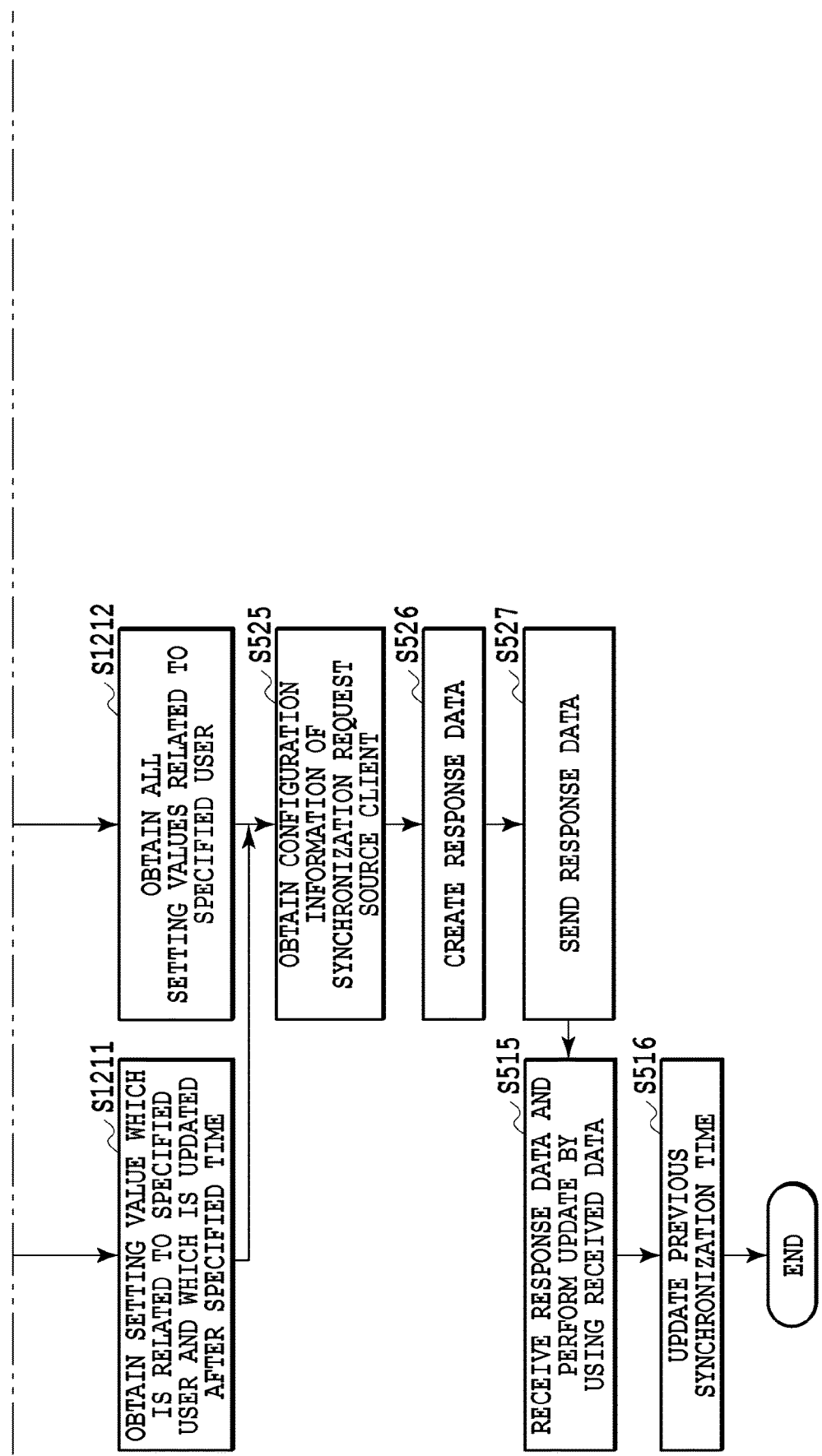

A flow of the synchronization processing for a setting value managed for each user is described by using FIGS. 12A and 12B. Note that, as in Example 1, description is first given of the synchronization processing for a setting value managed for each user by using FIGS. 12A and 12B, and then description is given of synchronization processing for a setting value in Example 4 in FIGS. 13 and 14. In FIGS. 12A and 12B, steps which are the same processing as the processing described in Example 1 are denoted by the same reference numerals, and detailed description thereof is omitted. A user logs into the multifunction printer 120. Then, in step S1201, the setting value management client application detects the login of the user. In the example, the login of the user is used as a trigger of a synchronization request.

Next, in step S1202, the setting value management client application determines whether previous synchronization time exists as in step S512 of FIG. 5. Note that, in step S1202, unlike in step S512, the setting value management client application determines whether the previous synchronization time (final synchronization time) of the setting value which is related to the login user exists as depicted in Table 12. In the case where the previous synchronization time of the setting value which is related to the login user exists, the flow proceeds to step S1203. In step S1203, the setting value management client application notifies a synchronization request of the setting value with specification of previous synchronization time and specification of user identification information indicating the login user, to the setting value management server app 310.

Meanwhile, in the case where the previous synchronization time does not exist, in step S1204, the setting value management client application notifies a synchronization request of the setting value without the specification of synchronization time and with only the specification of login user, to the setting value management server app 310.

In step S1210, the setting value management server app 310 determines presence or absence of specification of user for the received synchronization request. In the case where there is no specification of user, the flow proceeds to step S1213, and the same processing as the synchronization processing of the device setting value (S522) and the processing thereafter described in FIG. 5 is performed.

In the case where there is specification of user, the flow proceeds to step S522, and the setting value management server application determines whether there is specification of time for the synchronization request as in step S522 described in FIG. 5.

In the case where the time is specified, the flow proceeds to step S1211, and the setting value management server application obtains a setting value which is related to the specified user and whose server update time is after the specified time.

For example, assume a case where the user name "Administrator" logs in and the previous synchronization time is "2015/2/1 13:01" as depicted in Table 12. In this case, the data obtained in step S1211 is the setting value {Address Type: FTP, Address: 192.168.222.333, Display Name: Shared Server} of the user ID "1" in Table 13.

Meanwhile, in the case where no time is specified, the flow proceeds to step S1212, and the setting value management server application obtains all setting values related to the specified user.

In the case of sending the setting value obtained in step S1211 or S1212 as a response, as in steps S525 to S527 described in FIG. 5, the setting value management server application creates response data by obtaining the configuration information of the synchronization request source client. For example, assume a case where the serial number of the device which the user logs in is "1234567." In this case, referring to Table 14, the setting value management server application creates response data including only the data related to "license.application.AddressBook" and "license.application.Copy" and sends it as a response.

Lastly, the setting value management client application executes the same processing as the processing from steps S515 to S516 of FIG. 5, and the flow is terminated.

The processing of the setting value management server app 310 and the setting value management client app 320 like one described by using FIGS. 12A and 12B enables the synchronization processing for data managed for each user.

Note that, although description is given of the example in which the processing is switched in step S1210 of FIG. 12A depending on whether there is user specification in the synchronization request, the present invention is not limited to this mode. For example, the same processing as that in step S1213 may be performed also in the case where there is user specification in the synchronization request (YES in step S1210). Specifically, it is possible to employ a mode in which the synchronization processing of the common setting value for each device described in Example 1 and the like is also performed with the synchronization request with specification of user being a trigger.

Table 16 is a table in which time at which the device management configuration information is changed is managed by being further associated with Table 4 described in Example 1 to manage synchronization data consistency in the example. In the example, description is given of a configuration in which a response of performing resynchronization of all setting values in the setting value management server app 310 is sent in the case where the time attached to the synchronization request from the setting value management client app 320 is time before configuration information changed time. Specifically, description is given of an example in which the setting value management server app 310 obtains the setting value related to the login user as the setting value being the synchronization target, irrespective of the final update time of the setting value, and sends the setting value to the client as a response, according to the synchronization condition corresponding to the configuration of the device.

TABLE 16

Setting Values Stored in DB of Setting Value Management Server

| Device Serial No. | Device Code | Version | Configuration Changed Time |
|---|---|---|---|
| 1234567 | iR-ADV C5255 | Ver 00.01 | 2015/2/1 15:00 |
| 3124567 | iR-ADV C5240 | Ver 00.02 | 2015/2/2 15:00 |
| . . . | | | |

Figure 13:
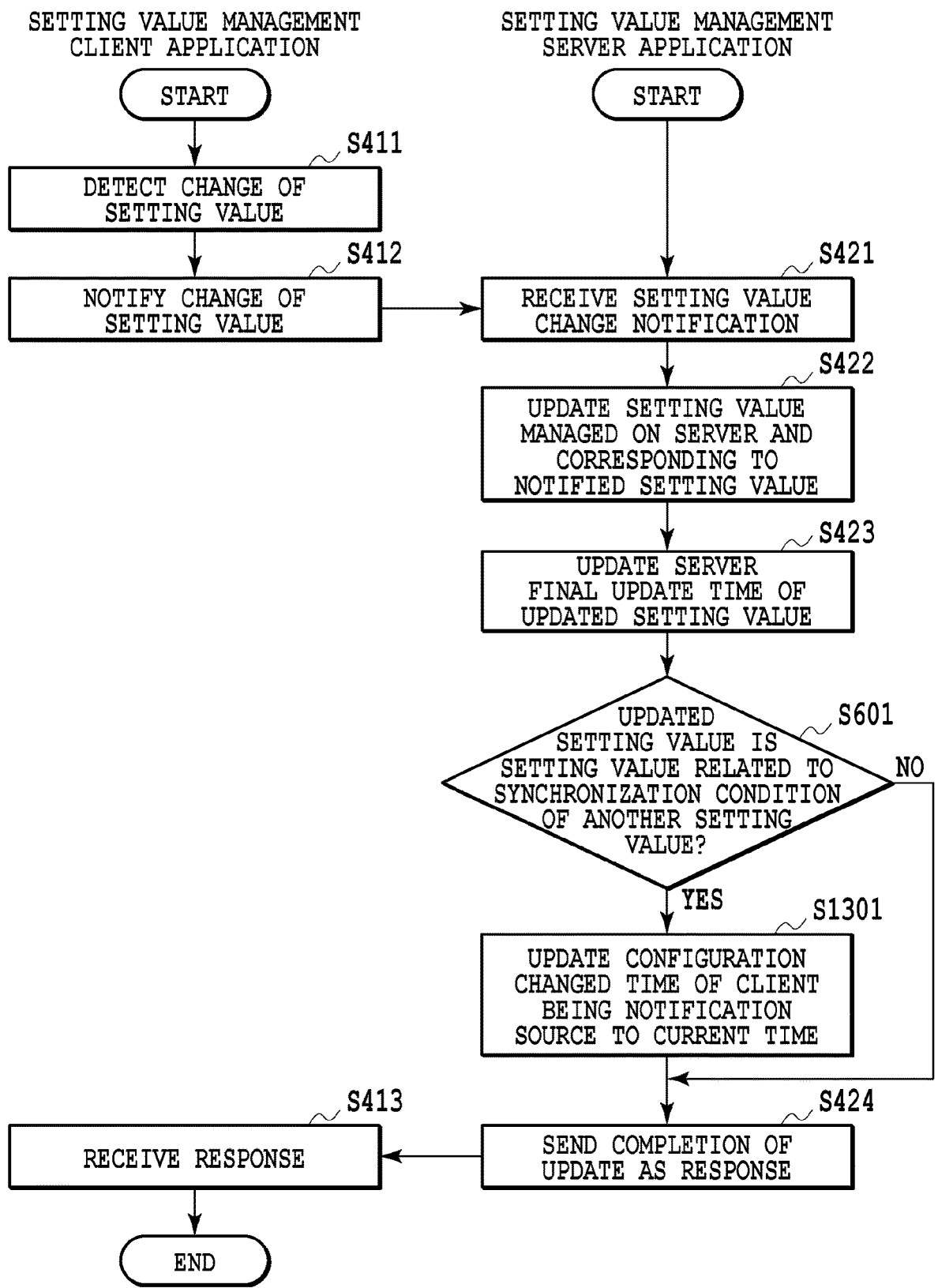
FIG. 13 is a diagram illustrating a flowchart of setting value update in Example 4.

Specific processing contents of are described by using the flowcharts of FIGS. 13 and 14.

FIG. 13 is basically the same processing as the processing described in FIG. 6. In FIG. 13, the processing from steps S411 to S601 is executed and then, in the case where the updated setting value is a setting value related to a synchronization condition of another setting value, the setting value management server application causes the flow to proceed to step S1301. In step S1301, the setting value management server application updates configuration changed time in Table 16 which corresponds to the notification source device, to current time. For example, in the case where the setting value whose change is notified is a setting value related to change in the configuration information of the device as depicted in Table 14 (for example, in the case where the "scan-to-send" function is enabled), the setting value management server application cause the flow to proceed to step S1301. This is because, as described in Example 1 and the like, in the case where the synchronization processing is performed before the time of configuration change, a setting value included in the synchronization condition with the configuration change may not be obtained as the synchronization target in the later synchronization processing in some cases.

Figure 14B:
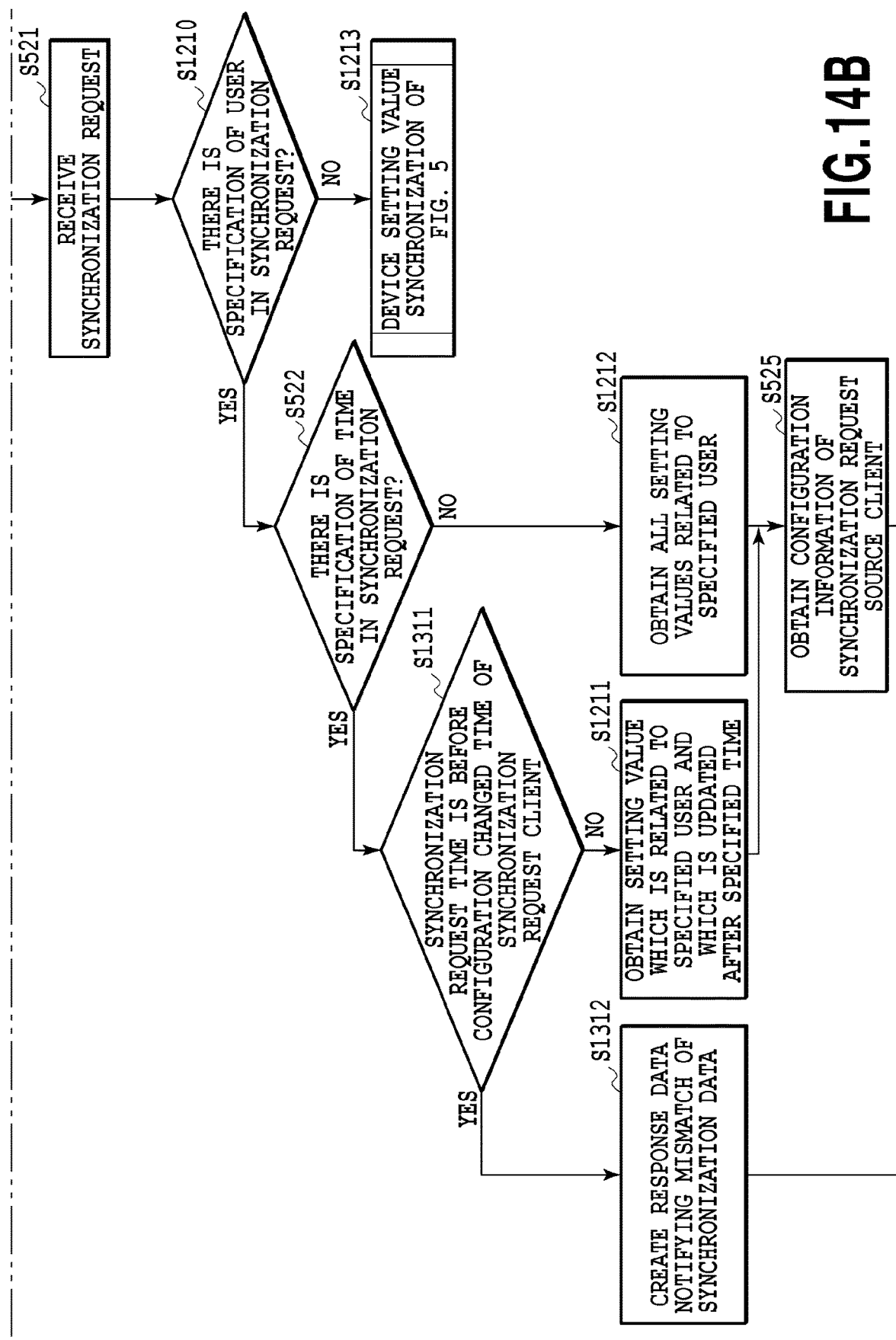
Figure 14C:
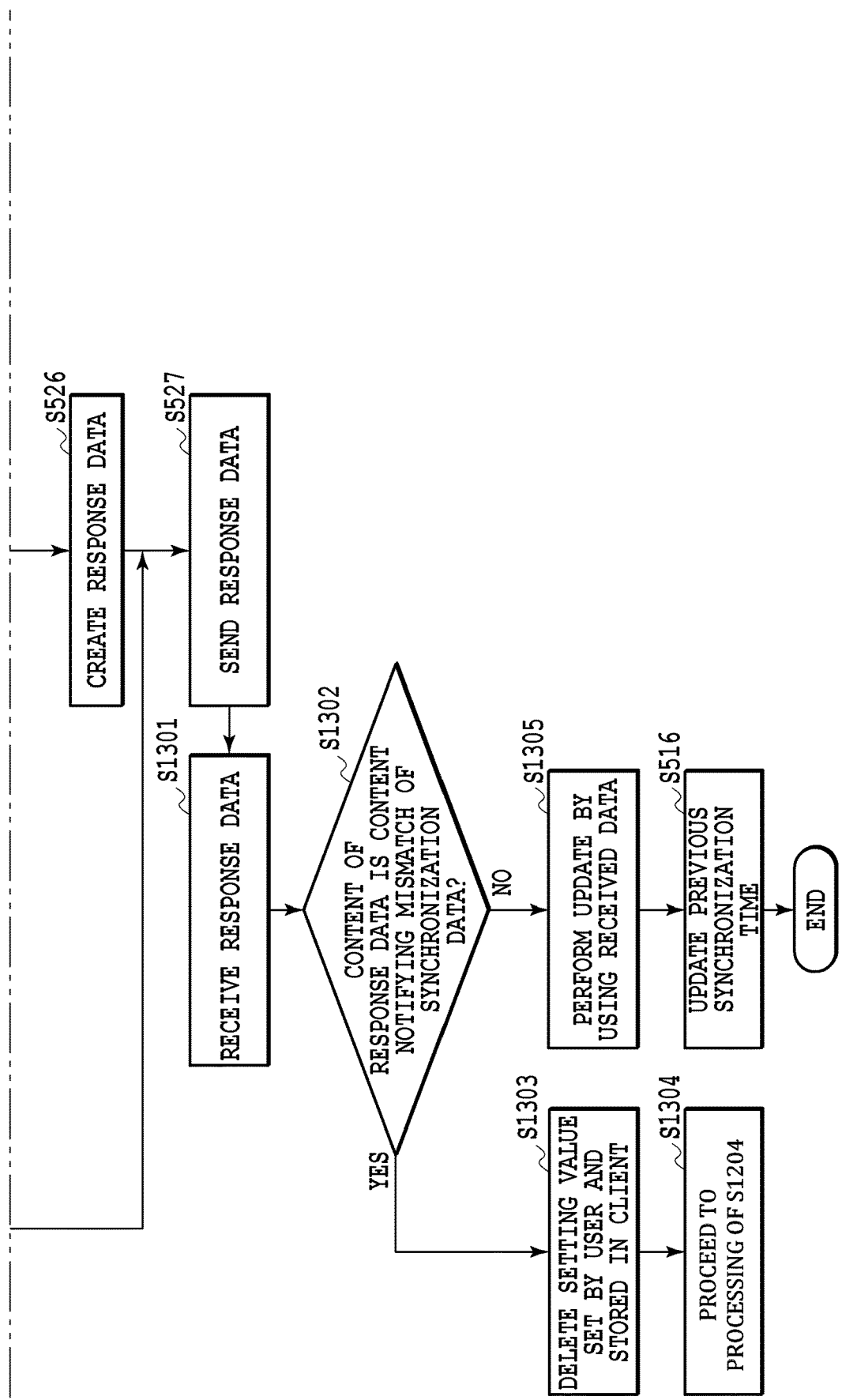

In view of this, by using FIGS. 14A to 14C, description is given of a synchronization method which eliminates a state where, as a result of data synchronization processing performed after changing of the configuration information of a device, mismatch occurs in synchronization between a setting value managed by the setting value management server app 310 and a setting value managed by the setting value management client app 320.

The processing of FIGS. 14A to 14C is described while focusing on differences from FIGS. 12A and 12B. In the case where there is specification of user in the received synchronization request (YES in S1210) and there is specification of time in the received synchronization request (YES in S522), the flow proceeds to step S1311. In step S1311, the setting value management server application compares the previous synchronization time attached to the synchronization request and the configuration changed time of the client being the synchronization request source which is depicted in Table 16.

In the case where the previous synchronization time attached to the synchronization request is before the configuration changed time of the device, a setting value included in the synchronization condition with the configuration change of the device would not be appropriately synchronized as described above. In view of this, in step S1312, the setting value management server application creates response data notifying mismatch in the synchronization state between the setting value management database 314 and the setting value management database 324. Then, the flow proceeds to step S527, and the created response data is transmitted.

In step S1301, the setting value management client app 320 receives the response data from the setting value management server application. Then, in step S1302, the setting value management client application determines whether a content of the received response data is a content notifying mismatch of the synchronization data. If the content is not a content notifying mismatch of the synchronization data, the flow proceeds to step S1305, and the setting value management client application performs update of the received data as in step S515. Then, step S516 is performed as in FIG. 12B and the flow is terminated.

Meanwhile, in the case where the content is a content notifying mismatch of the synchronization data, the flow proceeds to step S1303. In step S1303, the setting value client application deletes data set by the login user and stored in the setting value management database 324 of the setting value management client application. Then, the processing of step S1204 is executed as step S1304. Specifically, in step S1304, the setting value management client application sends a synchronization request with the specification of user and without the specification of time, to the setting value management server app 310. The setting value management server application receives the synchronization request of step S1304 and thereby makes determination of NO in step S522, and the flow proceeds to step S1212. Then, the setting value management server application obtains setting values related to the specified user, irrespective of the final update time of the setting values. Since the synchronization request of step S1304 is a synchronization request without the specification of time, determination in step S1311 by the setting value management server app 310 is not performed again. Meanwhile, in the case where the response data is response data other than that notifying mismatch of the synchronization data, all setting values set by the user in advance are updated and the previous synchronization time is updated. In summary, as a result of the synchronization request sent again, the previous synchronization time managed in the setting value client application is also appropriately updated. Accordingly, a case where a synchronization request with specification of time before the configuration changed time is sent multiple times is avoided.

Mismatch in the data synchronization due to configuration information change can be thereby eliminated also in the case where setting values are managed for each user in the setting value management server app 310 and the setting value management client app 320.

In recent information processing apparatuses such as personal computers and multifunction printers which are used and shared by multiple users, settings are stored for each user while being associated therewith. In the example, mismatch in the synchronization state due to configuration change in the information processing apparatus can be prevented in the case where data managed for each user is synchronized.

Other Example

Although the examples and modified examples are described above, the examples and the like described above are merely examples for carrying out the present invention. The processing and operations in the examples and the modified examples can be combined, and the present invention is not limited to the configurations of the examples.

Moreover, in Examples 1 to 3, description is mainly given of the examples in which mismatch of data to be synchronized occurs due to presence or absence of the FAX unit, and in Example 4, description is given of the example in which mismatch of data to be synchronized occurs due to presence or absence of an installed application or an enabled license.

However, the device configuration information only needs to be information indicating whether a predetermined configuration of the client is enabled or not. As other examples, setting values are changed also in the case where presence or absence of a license of a copy-forgery-inhibiting-pattern, presence or absence of a finisher, and the like are changed. Specifically, the setting value related to the configuration of the device may be a setting value indicating presence or absence of a license for a client device, a setting value indicating presence or absence of a function of the client device, a setting value indicating a state of the license, or a setting value indicating a state of the function. The present invention can be applied to the case where setting values and the like related to the configuration information of a device being the client are managed as described above. As described above, the configuration of the client is not limited to the multifunction printer, and the present invention can be applied to an information terminal device and the like which is a device managing setting values and in which the setting values are changed by using information pieces specifying the configuration of the device. For example, the present invention can be applied to information processing apparatuses having configurations of a personal computer, a mobile phone terminal, a smartphone terminal, an image forming apparatus, an electronic watch, an electronic organizer, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in the case of performing differential synchronization of data, the data can be synchronized with consistency of the data maintained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-052061, filed Mar. 16, 2015, and Patent Application No. 2015-250357, filed Dec. 22, 2015 which are hereby incorporated by reference wherein in its entirety.

What is claimed is:

1. An information processing apparatus connectable with a plurality of client apparatuses, comprising:
   a memory device that stores a set of instructions; and
   at least one processor that executes the set of instructions to:
   manage a plurality of setting values, wherein the plurality of setting values are used in the plurality of client apparatuses and updated based on an update request from any of the client apparatuses;
   receive a first notification indicating change in the configuration of a first client apparatus from the first client apparatus among the plurality of client apparatuses;
   store a first time at which a configuration of the first client apparatus is changed;
   receive a synchronization request from the first client apparatus for synchronizing a setting value in the first client apparatus with a managed setting value;
   determine at least one setting value to be sent based on a second time included in the synchronization request, wherein the stored first time indicates a time at which the configuration of the first client apparatus is changed, and the second time indicates a time at which a previous synchronization process is performed;
   determine configuration information indicating a configuration enabled on the first client apparatus; and
   send the determined at least one setting value to be sent to the first client apparatus,
   wherein the determined at least one setting value differs between a first case and a second case, the first case being a case in which the second time indicating the time at which the previous synchronization process is performed is later than the first time indicating the time at which the configuration of the first client apparatus is changed, the second case being a case in which the second time is earlier than the first time,
   wherein in the first case, a setting value updated earlier than the second time is not determined to be sent and a setting value for which the configuration of the first client apparatus is enabled among at least one setting value updated later than the second time is determined to be sent, and
   wherein in the second case, (a) send information indicating a mismatch of synchronization to the first client apparatus, (b) receive a request for obtaining at least one setting value sent from the first client apparatus based on the information indicating a mismatch of synchronization, (c) send to the first client apparatus a setting value for which the configuration of the first client apparatus is enabled among at least one setting value including both a setting value updated later than the second time and a setting value updated earlier than the second time.

2. The information processing apparatus according to claim 1, wherein the second time is obtained in response to a reception of the synchronization request including identification information on a user of the first client apparatus, and the previous synchronization process is performed for a setting value associated with the identification information.

3. The information processing apparatus according to claim 1, wherein the setting value sent to the first client apparatus does not include a setting value having a type corresponding to a configuration disabled in the first client apparatus.

4. The information processing apparatus according to claim 3, wherein whether the configuration of the first client apparatus is enabled or disabled is determined based on at least one of a setting value indicating presence or absence of a license for the configuration, a setting value indicating presence or absence of a function related to the configuration, a setting value indicating a state of the license, and a setting value indicating a state of the function.

5. The information processing apparatus according to claim 1, wherein the setting value of which synchronization processing is performed is user data of a login user of the first client apparatus.

6. A data synchronization method in an information processing apparatus connectable with a plurality of client apparatuses, wherein the information processing apparatus manages a plurality of setting values, wherein the plurality of setting values are used in the plurality of client apparatuses and updated based on an update request from any of the client apparatuses,
   the method comprising:
   a receiving step of receiving a first notification indicating change in the configuration of a first client apparatus from the first client apparatus among the plurality of client apparatuses;
   a storing step of storing a first time at which a configuration of the first client apparatus is changed;
   a receiving step of receiving a synchronization request from the first client apparatus for synchronizing a setting value in the first client apparatus with a managed setting value;
   a determining step of determining at least one setting value to be sent based on a second time included in the synchronization request, wherein the stored first time indicates a time at which the configuration of the first client apparatus is changed, and the second time indicates a time at which a previous synchronization process is performed;
   a determining step of determining configuration information indicating a configuration enabled on the first client apparatus; and
   a sending step of sending the determined at least one setting value to be sent to the first client apparatus,
   wherein the determined at least one setting value differs between a first case and a second case, the first case being a case in which the second time indicating the time at which the previous synchronization process is performed is later than the first time indicating the time at which the configuration of the first client apparatus is changed, the second case being a case in which the second time is earlier than the first time,
   wherein in the first case, a setting value updated earlier than the second time is not determined to be sent and a setting value for which the configuration of the first client apparatus is enabled among at least one setting value updated later than the second time is determined to be sent, and
   wherein in the second case, (a) send information indicating a mismatch of synchronization to the first client apparatus, (b) receive a request for obtaining at least one setting value sent from the first client apparatus based on the information indicating a mismatch of synchronization, (c) send to the first client apparatus a setting value for which the configuration of the first client apparatus is enabled among at least one setting value including both a setting value updated later than the second time and a setting value updated earlier than the second time.

7. A non-transitory computer-readable storage medium storing a program which causes a computer to perform a data synchronization method in an information processing apparatus connectable with a plurality of client apparatuses, wherein the information processing apparatus manages a plurality of setting values, wherein the plurality of setting values are used in the plurality of client apparatuses and updated based on an update request from any of the client apparatuses, the method comprising:
- a receiving step of receiving a first notification indicating change in the configuration of a first client apparatus from the first client apparatus among the plurality of client apparatuses;
- a storing step of storing a first time at which a configuration of the first client apparatus is changed;
- a receiving step of receiving a synchronization request from the first client apparatus for synchronizing a setting value in the first client apparatus with a managed setting value;
- a determining step of determining at least one setting value to be sent based on a second time included in the synchronization request, wherein the stored first time indicates a time at which the configuration of the first client apparatus is changed, and the second time indicates a time at which a previous synchronization process is performed;
- a determining step of determining configuration information indicating a configuration enabled on the first client apparatus; and
- a sending step of sending the determined at least one setting value to be sent to the first client apparatus, wherein the determined at least one setting value differs between a first case and a second case, the first case being a case in which the second time indicating the time at which the previous synchronization process is performed is later than the first time indicating the time at which the configuration of the first client apparatus is changed, the second case being a case in which the second time is earlier than the first time, wherein in the first case, a setting value updated earlier than the second time is not determined to be sent and a setting value for which the configuration of the first client apparatus is enabled among at least one setting value updated later than the second time is determined to be sent, and wherein in the second case, (a) send information indicating a mismatch of synchronization to the first client apparatus, (b) receive a request for obtaining at least one setting value sent from the first client apparatus based on the information indicating a mismatch of synchronization, (c) send to the first client apparatus a setting value for which the configuration of the first client apparatus is enabled among at least one setting value including both a setting value updated later than the second time and a setting value updated earlier than the second time.

* * * * *